(12) United States Patent
Shimozono

(10) Patent No.: US 6,556,534 B2
(45) Date of Patent: Apr. 29, 2003

(54) OBJECTIVE LENS AND OPTICAL DEVICE

(75) Inventor: Hiroaki Shimozono, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 73 days.

(21) Appl. No.: 09/822,356

(22) Filed: Apr. 2, 2001

(65) Prior Publication Data

US 2001/0038597 A1 Nov. 8, 2001

(30) Foreign Application Priority Data

Mar. 31, 2000 (JP) ........................................ 2000-099580

(51) Int. Cl.⁷ ................................................ G11B 7/00
(52) U.S. Cl. .................................................. 369/112.26
(58) Field of Search ........................ 369/112.01, 112.23, 369/112.24, 112.25, 112.26, 112.22

(56) References Cited

U.S. PATENT DOCUMENTS

| | | |
|---|---|---|
| 5,835,473 A | 11/1998 | Shimozono et al. |
| 5,930,214 A | 7/1999 | Kasahara et al. |
| 6,061,324 A | 5/2000 | Arai et al. |
| 6,097,691 A | 8/2000 | Shimozono |
| 6,118,594 A | 9/2000 | Maruyama |
| 6,118,749 A | 9/2000 | Arai et al. |
| 6,134,055 A | 10/2000 | Koike |
| 6,215,756 B1 | 4/2001 | Shimano et al. |
| 6,243,349 B1 | 6/2001 | Arai et al. |
| 6,256,284 B1 | 7/2001 | Shimano et al. |
| 6,370,103 B1 * | 4/2002 | Yamazaki et al. ..... 369/112.26 |
| 2001/0005351 A1 | 6/2001 | Shimano et al. |
| 2001/0017830 A1 | 8/2001 | Arai et al. |

FOREIGN PATENT DOCUMENTS

| | | |
|---|---|---|
| EP | 1 122 573 | 8/2001 |
| JP | 64-25113 | 1/1989 |
| JP | 4-28282 | 5/1992 |
| JP | 7-72386 | 3/1995 |
| JP | 8-179195 | 7/1996 |
| JP | 9-43510 | 2/1997 |
| JP | 9-81953 | 3/1997 |
| JP | 9-306023 | 11/1997 |
| JP | 11-16190 | 1/1999 |
| JP | 11-287948 | 10/1999 |
| JP | 2001-4916 | 1/2001 |
| JP | 2001-229567 | 8/2001 |

* cited by examiner

Primary Examiner—Paul W. Huber
(74) Attorney, Agent, or Firm—Oblon, Spivak, McClelland, Maier & Neustadt, P.C.

(57) ABSTRACT

An objective lens used in the recording of a CD or a DVD, wherein a ringed step portion is provided in a first surface of an objective lens, the step portion is provided in a first surface of an objective lens, and the step portion producing a phase difference with respect to light having a first wavelength. In addition, a ringed step portion is provided in a second surface of the objective lens. The second step portion produces a phase difference with respect to light having a second wavelength.

17 Claims, 13 Drawing Sheets

OBJECTIVE LENS AND OPTICAL DEVICE

BACKGROUND OF THE INVENTION

1. Field of the Invention

The present invention relates to an objective lens for use in recording or reproducing an optical disk, such as a CD (compact disk), a DVD (digital video disk), etc., having a diffraction-limited performance; and to an optical device using such an objective lens, wherein CD includes recordable CD-R.

2. Discussion of the Background

There have been proposed objective lenses for reading DVD comprising a transparent substrate having a thickness of 0.6 mm and CD comprising a transparent substrate having a thickness of 1.2 mm (JP-A-10-255305, JP-A-11-16190, JP-A-11-2759).

In these conventional techniques, a phase shifter having a concave portion or a convex portion, which is formed in a ringed belt-like shape around the optical axis as the center, is provided in a surface of the objective lens having an aspheric surface. The basic structure of the objective lens is optimized so as to be capable of reading a DVD, preferably. When a CD is to be read, the phase is corrected by the phase shifter so that the aberration is made as small as possible. As a result, for both DVD and CD, the correction can preferably be achieved with respect to the on-axial aberration, in particular, the on-axial spherical aberration.

In the conventional techniques, however, a preferred correction could not be achieved with respect to the off-axial coma aberration at the time of reading a CD. Namely, since the off-axial coma aberration was large, the optical performance showed a large reduction when the light source, the objective lens, etc. was inclined from the optical axis or shifted from the optical axis. Therefore, high accuracy was required for positioning the objective lens and other elements in assembling the optical device. Hence, productivity was poor.

Further, since high accuracy was required in determining the position of the objective lens, gradual deterioration of the optical performance was caused with a lapse of time due to the wearing or another cause of a mechanism for moving the lens or the light source (a moving mechanism), the wearing resulting in an inclination or a shift of the objective lens from the optical axis.

Further, since the off-axial coma aberration was large, an allowable range became narrow in determining the position of the objective lens, in particular, a shift from the optical axis in autofocus driving to the objective lens when the optical device was actually operated. Therefore, there was the problem that the optical performance was reduced.

SUMMARY OF THE INVENTION

An object of the present invention is to solve the above-mentioned disadvantages, and to provide an objective lens capable of correcting well both the on-axial aberration and the off-axial aberration when a plurality of optical disks such as, for example, DVD, CD, etc. are recorded or read. A further objective is to provide an optical device using the objective lens.

In accordance with the present invention, there is provided an objective lens having aspheric surfaces at both surfaces, used for an optical system wherein light from one or two light sources having different wavelengths with respect to two optical disks is converged to respective data recording surfaces of the optical disks, and reflection light from the respective data recording surfaces is received by a light receiving element in recording or reading the optical disks, respectively. The objective lens is characterized in that in recording or reading a first optical disk, a first wavelength $\lambda_1$ is used, and in recording or reading a second optical disk, a second wavelength $\lambda_2$ is used. A first phase shifter provided with ring-like step portions having the center coincident with the optical axis is provided in a surface of the objective lens, the first phase shifter producing a phase difference with respect to light having the first wavelength. A second phase shifter provided with ring-like step portions having the center coincident with the optical axis is provided in the other surface of the objective lens, the second phase shifter producing a phase difference with respect to light having the second wavelength $\lambda_2$.

Further, there is provided an optical device comprising an objective lens having aspheric surfaces at both surfaces, wherein light from one or two light sources having different wavelengths with respect to two optical disks is converged to respective data recording surfaces of optical disks, and reflection light from the respective data recording surfaces is received by a light receiving element in recording or reading the optical disks, respectively.

DESCRIPTION OF THE PREFERRED EMBODIMENTS

Preferred Embodiments f the objective lens and the optical device of the present invention will be described with reference to the drawings.

Figure 1:
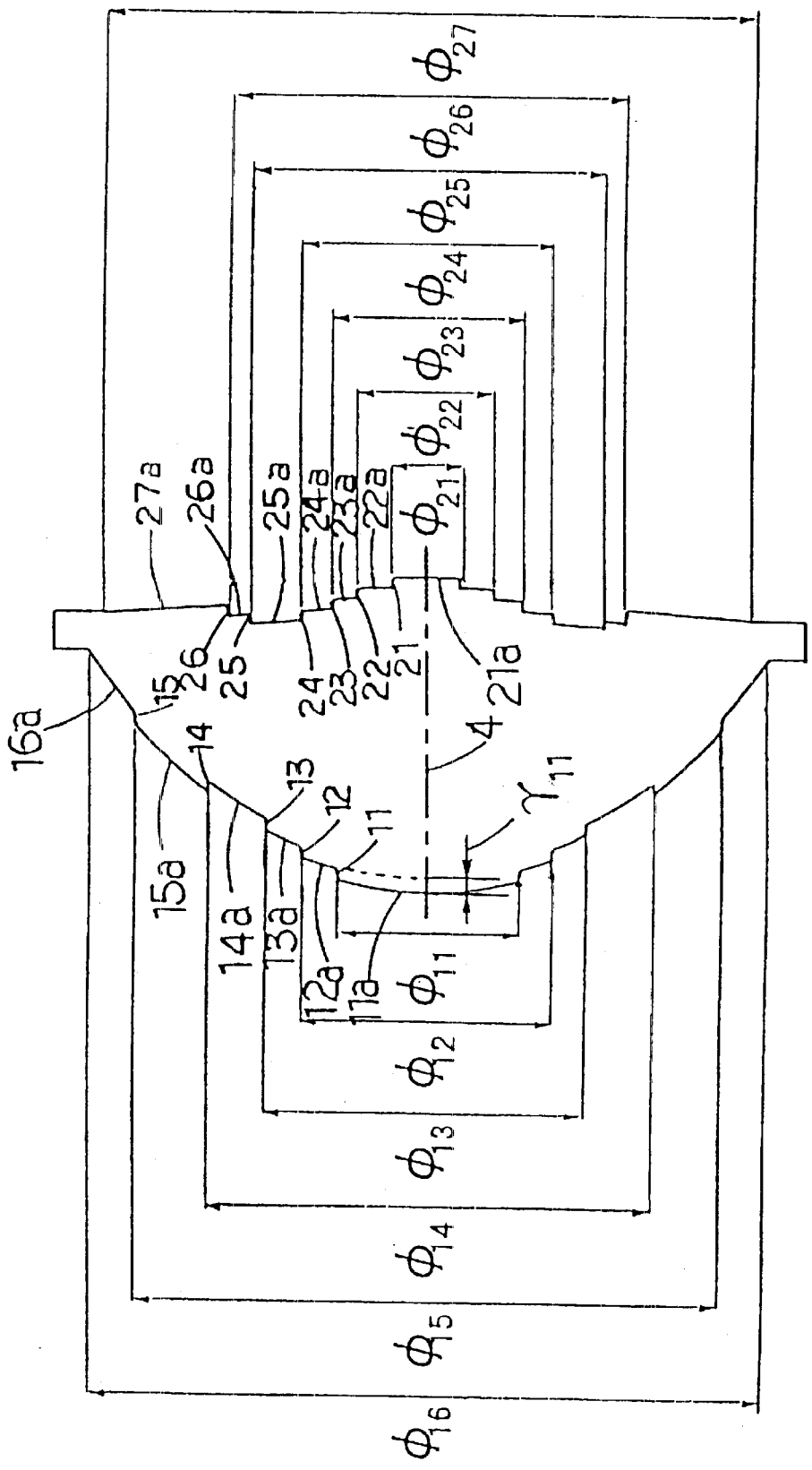
FIG. 1 is a cross-sectional view showing an Embodiment of the objective lens according to the present invention.
Figure 2:
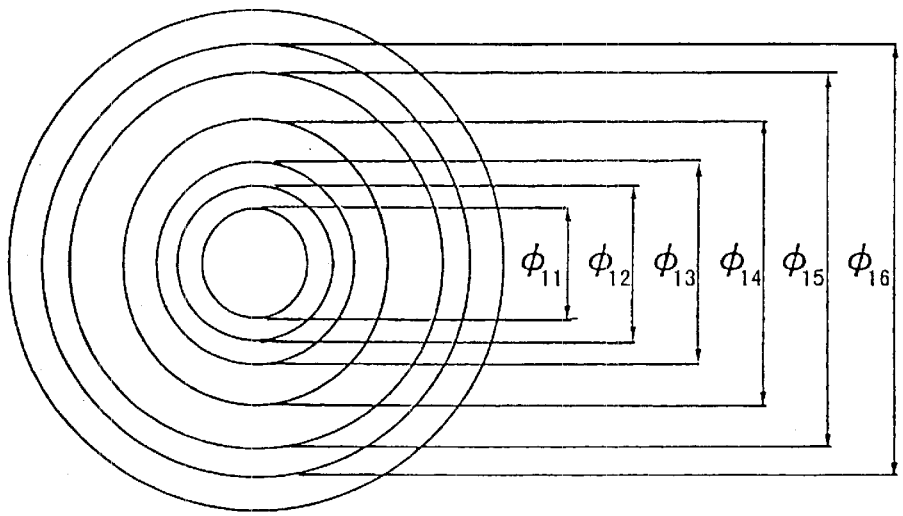
FIG. 2 is a front view of the objective lens shown in FIG. 1 which is observed from a side of the light source.
Figure 3:
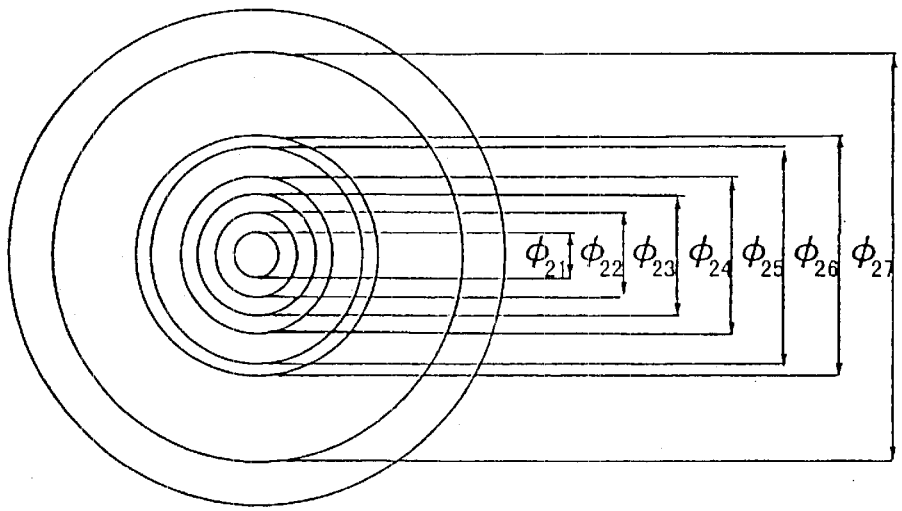
FIG. 3 is a rear view of the objective lens shown in FIG. 1.

FIG. 1 is a cross-sectional view showing an Embodiment of the objective lens of the present invention, which is sectioned in parallel to and on the optical axis 4, and is observed from a direction perpendicular to the optical axis 4. Directions are determined based on the surface of the papers on which figures are drawn (when the A4 papers are observed in a longitudinal direction, a left side corresponds to an upper portion and a lower portion corresponds to a light source side). FIG. 2 is a front view of the objective lens shown in FIG. 1, observed from the light source side, and FIG. 3 is a rear view with respect to FIG. 2.

In FIG. 1, reference numerals 11, 12, 13, 14 and 15 designate ring-like step portions having the center coincident with the optical axis; numerals 21, 22, 23, 24, 25 and 26 designate ring-like step portions having the center coincident with the optical axis 4; characters $\Phi_{11}, \Phi_{12}, \Phi_{13}, \Phi_{14}$ and $\Phi_{15}$ designate respectively the diameter of an inner side of the step portions 11, 12, 13, 14 and 15; $\Phi_{16}$ designates an effective diameter of the first surface; $\Phi_{21}, \Phi_{22}, \Phi_{23}, \Phi_{24}, \Phi_{25}$ and $\Phi_{26}$ designate respectively the diameter of an inner side of the step portions 21, 22, 23, 24, 25 and 26, and $\Phi_{27}$ designates an effective diameter of the second surface. The angle of each step portion is not limited to a right angle but it may have an angle gently inclined. In the following description, dimensions such as distance, interval, length, thickness and so on are expressed by a unit of mm unless specifically described.

The objective lens of the present invention is used for an optical system in which light from one or two light sources having different wavelengths with respect to two optical disks is converged to respective data recording surfaces of the optical disks and reflected light from the respective recording surfaces is received by a light receiving element in recording or reading the optical disks. The objective lens of the present invention has aspheric surfaces in both surfaces.

When the first optical disk is recorded or read, the first wavelength is used, and when the second optical disk is recorded or read, the second wavelength is used. In a surface of the objective lens, the first phase shifter provided with, for example, the ring-like step portions 11, 12, 13, 14 and 15 having the center coincident with the optical axis is provided. The first phase shifter has function to produce a phase difference with respect to the light having the first wavelength (i.e., to shift the phase of the light having the first wavelength). By shifting the phase of the light having the first wavelength, the aberration, in particular, the on-axial spherical aberration is improved in recording or reading the first optical disk.

In the other surface of the objective lens, the second phase shifter provided with, for example, the ring-like step portions 21, 22, 23, 24, 25 and 26 having the center coincident with the optical axis is provided. The second phase shifter has function to produce a phase difference with respect to the light having the second wavelength (i.e., to shift the phase of the light having the second wavelength). By shifting the phase of the light having the second wavelength, the aberration, in particular, the on-axial spherical operation is improved in recording or reading the second optical disk. The number of the step portions is not limited to that shown in FIG. 1 but the change is optional.

It is possible that the first phase shifter is provided in the first surface (the surface at a light source side) of the objective lens, and the second phase shifter is provided in the second surface (the surface at an optical disk side) of the objective lens. Or, it is possible that the first phase shifter is provided in the second surface of the objective lens, and the second phase shifter is provided in the first surface of the objective lens. The step portions for forming the first phase shifter or the second phase shifter may comprise convex portions or concave portions provided in the surfaces of the objective lens.

In order to shift the phase of the light having the first wavelength, it is preferable that the dimensions and the shape of the step portions of the first phase shifter is determined so that a phase difference caused by the light having the first wavelength is i times of $0.9\ \lambda_2$ to $1.1\ \lambda_2$ where $\lambda 2$ represents the second wavelength and i represents a natural number, when it is converted into a distance.

In order to shift the phase of the light having the first wavelength, it is more preferable that the dimensions and the shape of the step portions of the first phase shifter are determined so that a phase difference caused by the light having the first wavelength is in a range of from $(i-0.1)\lambda_2$ to $(i+0.1)\lambda_2$ when it is converted into a distance.

In order that the phase difference caused by the light having the first wavelength is i times of $0.9\ \lambda_2$ to $1.1\ \lambda_2$, the head $\gamma_1$ of each ring-like step portion of the first phase shifter, $\lambda_2$ and the refractive index $n_2$ of a material for the objective lens 3 to the second wavelength satisfy the following Formula 1.

$$0.9i\lambda_2/(n_2-1) \leq \gamma_1 \leq 1.1i\lambda_2/(n_2-1) \qquad \text{Formula 1}$$

In order that the phase difference caused by the light having the first wavelength is in a range of from $(i-0.1)\ \lambda_2$ to $(i+0.1)\ \lambda_2$, it is necessary to satisfy the following Formula 2.

$$(i-0.1)\ \lambda_2/(n_2-1) \leq \gamma_1 \leq (i+0.1)\lambda_2/(n_2-1) \qquad \text{Formula 2}$$

Here, in a case that each aspheric surface having a ring-like shape is provided between the ring of a step portion and the ring of another step portion, or in the vicinity of the effective diameter (hereinbelow, referred to as each ringed belt-like aspheric surface or ringed belt-like aspheric surfaces), a head means a distance between the crossing point of an extension from a ringed belt-like aspheric surface toward the optical axis 4 according to Formula 5 described after and the optical axis 4 and the apex of the surface of the objective lens in which the ringed belt-like aspheric surface is provided. For example, there is a distance $\gamma_{11}$ (the head of the step portion 11) in FIG. 1. This distance is along the optical axis 4. The way of thinking of the head is also applicable to Formulae 3 and 4 described after.

Further, in order to shift the phase of the light having the second wavelength, it is preferable that the dimensions and the shape of the step portions of the second phase shifter are determined so that a phase difference caused by the light having the second wavelength is j times of 0.9 $\lambda_1$ to 1.1 $\lambda_1$ where $\gamma_1$ represents the first wavelength and j represents a natural number when it is converted into a distance.

In order to shift the phase of the light having the second wavelength, it is more preferable that the dimensions and the shape of the step portions of the second phase shifter are determined so that a phase difference caused by the light having the second wavelength $\lambda_2$ is in a range of from $(j-0.1)\lambda_1$ to $(j+0.1)\lambda_1$ when it is converted into a distance.

In order that the phase difference caused by the light having the second wavelength is j times of 0.9 $\lambda_1$ to 1.1 $\lambda_1$, the head $\gamma_2$ of each ringed belt-like step portion of the second phase shifter, $\lambda_1$ and the refractive index $n_1$ of a material for the objective lens should satisfy the following Formula 3.

$$0.9j\lambda_1/(n_1-1) \leq \gamma_2 \leq 1.1j\lambda_1/(n_1-1) \quad \text{Formula 3}$$

In order that the phase difference caused by the light having the second wavelength $\lambda_2$ is in a range of from $(j-0.1)\lambda_1$ to $(j+0.1)\lambda_1$ when it is converted into a distance, the head $\gamma_2$ of each ringed belt-like step portion of the second phase shifter, $\lambda_1$ and the refractive index $n_1$ of a material for the objective lens should satisfy the following Formula 4.

$$(j-0.1)\lambda_1/(n_1-1) \leq \gamma_2 \leq (j+0.1)\lambda_1/(n_1-1) \quad \text{Formula 4}$$

When a numerical aperture $NA_1$ of the objective lens in recording or reading the first optical disk and a numerical aperture $NA_2$ of the objective lens in recording or reading the second optical disk satisfy $NA_1 > NA_2$, it is preferable that an inner diameter $\Phi_1$ of the step portion having the smallest diameter among the step portions of the first phase shifter, an effective diameter $\Phi_A$ of the surface of the objective lens in which the first phase shifter is provided (corresponding to $\Phi_{16}$ in FIG. 1), an inner diameter $\Phi_2$ of the step portion having the smallest diameter among the step portions of the second phase shifter, and an effective diameter $\Phi_B$ of the surface of the objective lens in which the second phase shifter is provided (corresponding to $\Phi_{27}$ in FIG. 1), satisfy $\Phi_1/\Phi_A > \Phi_2/\Phi_B$.

It is because correction of the aberration has to be conducted to the second phase shifter in a range of $NA_2$ having a smaller numerical aperture. When $\Phi_{11}/\Phi_A > \Phi_2/\Phi_B$ is not satisfied, recording or reading to the second optical disk may not be performed well. By the same reason, it is preferable to satisfy $\Phi_1/\Phi_A > \Phi_2/\Phi_B$ when $NA_1 > 1.2 NA_2$ is established.

It is preferable that in establishment of $1.5 t_1 < t_2$, the total number of rings of the step portions of the first phase shifter is 3–10, and the total number of the rings of the step portions of the second phase shifter is 3–10. When the total number is respectively 3 or less, the on-axial spherical aberration may not be corrected well. Further, in consideration that the effective diameters of the first and second surfaces of the objective lens are generally 5.0 mm or less, the rings of the step portions exceeding 10 may cause difficulty in manufacturing. Preferably, the total number of the rings of the step portions of the first phase shifter is 4–8, and the total number of the rings of the step portions of the second phase shifter is 5–8.

Figure 4:
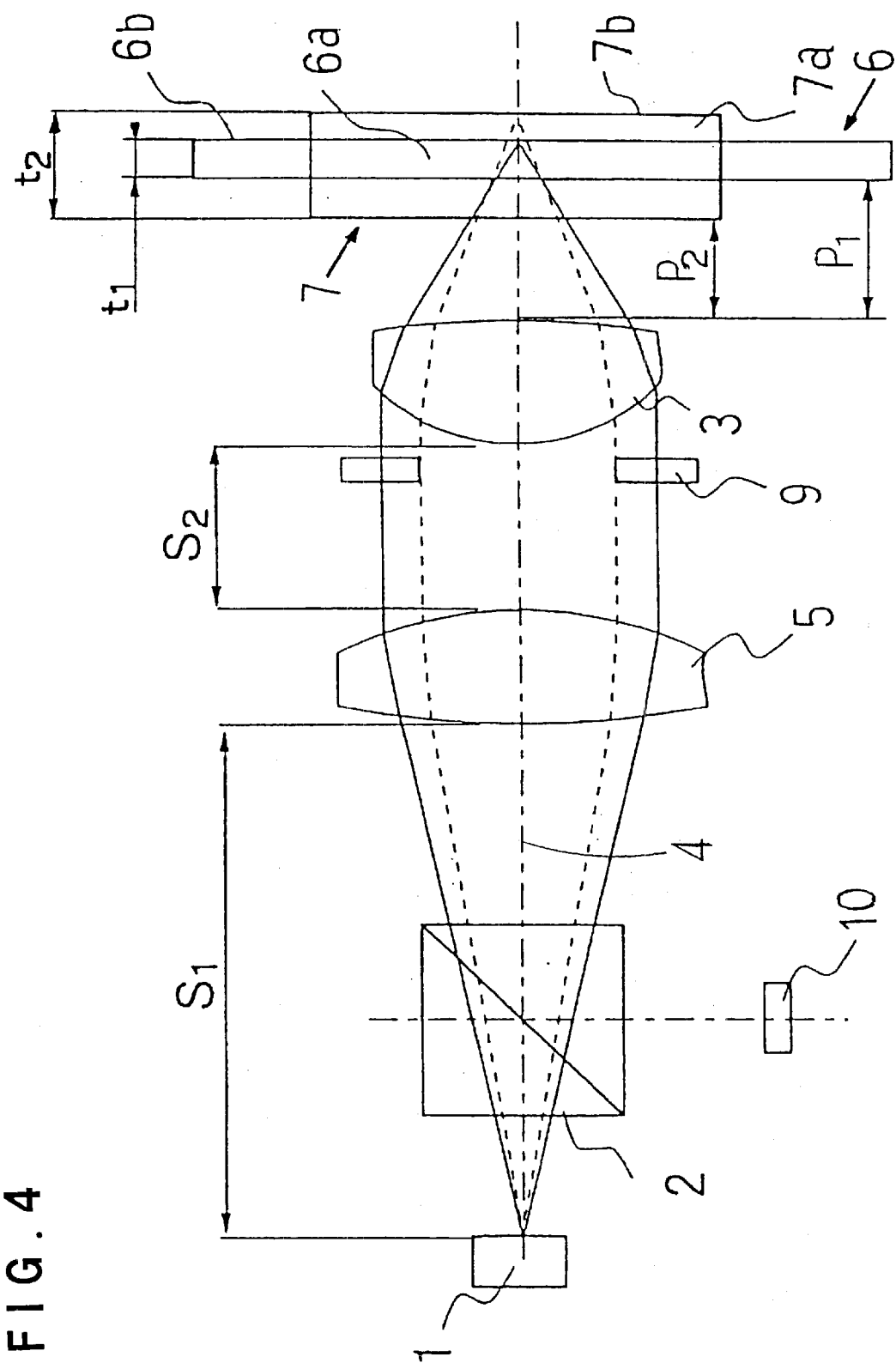
FIG. 4 is a diagram showing an Embodiment of the optical device according to the present invention.

FIG. 4 is a diagram showing an embodiment of the optical device according to the present invention. In FIG. 4, reference numeral 1 designates a light source, numeral 2 designates an optical medium having a reflecting function, numeral 3 an objective lens, numeral 5 an auxiliary lens, numeral 6 a first optical disk, numeral 6a a transparent substrate of the first optical disk 6 (hereinbelow, referred to as a first transparent substrate), numeral 6b a data recording surface of the first optical disk 6 (hereinbelow referred to as a first data recording surface), numeral 7 a second optical disk, numeral 7a a transparent substrate of the second optical disk 7 (hereinbelow, referred to as a second transparent substrate), numeral 7b a data recording surface of the second optical disk 7 (hereinbelow, referred to as a second data recording surface), numeral 9 an aperture, numeral 10 a light receiving element, character S1 the distance on the optical axis from the light source 1 to the surface (the first surface) at a light source side of the auxiliary lens 5, and character $S_2$ the distance on the optical axis from the surface (the second surface) at an optical disk side of the auxiliary lens 5 to the first surface of the objective lens 3.

In the optical device shown in FIG. 4, the numerical aperture $NA_1$ of the objective lens 3 in recording or reading the first optical disk by using the first wavelength and the numerical aperture $NA_2$ of the objective lens 3 in recording or reading the second optical disk by using the second wavelength satisfy $NA_1 > NA_2$.

Figure 5:
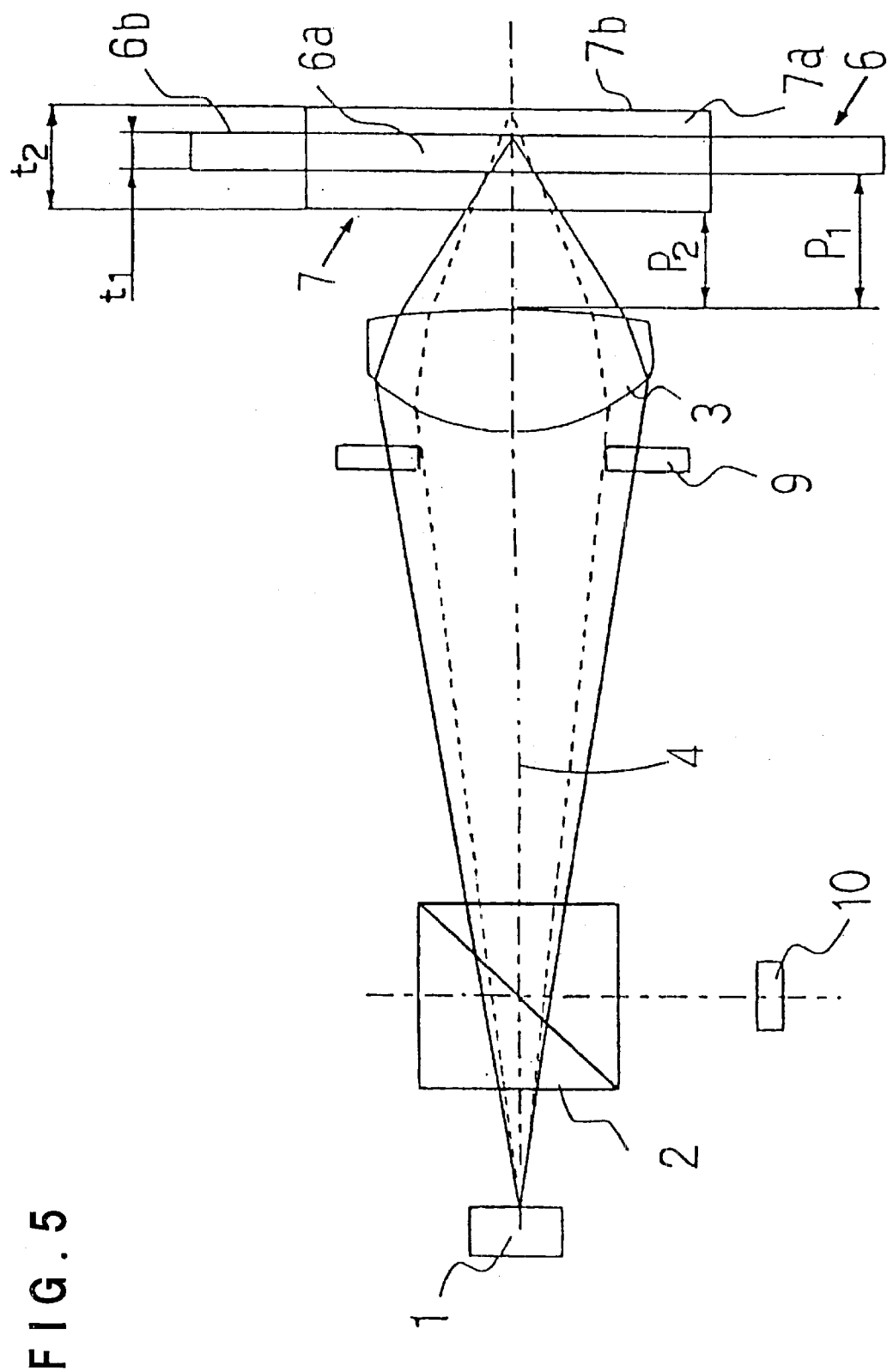
FIG. 5 is a diagram of an Embodiment of the optical device which is different from that shown in FIG. 4.

FIG. 5 is a diagram showing an embodiment different from that shown in FIG. 4. In the optical device shown in FIG. 5, light from the light source 1 is converged to the data recording surface of the optical disk by only the objective lens 3.

In FIG. 4, light having the first wavelength emitted from the light source 1 is successively passed through the optical medium 2, the auxiliary lens 5 and the objective lens 3 to be introduced into and converged on the first data recording surface 6b. In FIG. 5, since the auxiliary lens 5 is not provided, light having the first wavelength is successively passed through the optical medium 2 and the objective lens 3 to be introduced into and converged on the first data recording surface 6b.

In FIG. 4, light having the second wavelength emitted from the light source 1 is successively passed through the optical medium 2, the auxiliary lens 5 and the objective lens 3 to be introduced into and converged on the second data recording surface 7b. In FIG. 5, since the auxiliary lens 5 is not provided, light having the first wavelength is successively passed through the optical medium 2 and the objective lens 3 to be introduced into and converged on the second data recording surface 7b.

The light having the first wavelength reflected by the first data recording surface 6b and the light having the second wavelength reflected by the second data recording surface 7b are returned on the light paths along which they come and are reflected by the optical medium 2 to be received by the light receiving element 10.

The optical systems of the optical devices shown in FIGS. 4 and 5 form finite type optical systems in their entirety. The objective lens 3 in FIG. 4 may be an infinite type lens when the auxiliary lens is a collimeter lens. The objective lens in FIG. 5 is a finite type lens. It is because light from the light source located in a range of finite distance with respect to an optical disk is converged to the data recording surface of the optical disk. The objective lens 3 includes an objective lens designed as an infinite type which is usable as a finite type even in a case that a finite type lens can be used.

Further, marks representing digital signals are recorded in the first data recording surface 6b and the second data recording surface 7b. When the dimension of 1 pit for each mark is several $\mu$m or less, the optical system of the optical device of the present invention has a diffraction-limited performance in order to achieve precise recording or reading.

As the light source 1, a laser light source or the like may be mentioned, for example. Assumed that the first optical disk 6 is DVD and the second optical disk 7 is CDs, a laser light source having a wavelength of 780 nm may be used for CD and a laser light source having a wavelength 650 nm may be used for DVD, for example. However, the wavelengths of the light sources are not limited to the above-mentioned 650 nm and 780 nm.

In the optical device shown in FIG. 4, a combination of the auxiliary lens 5 and the objective lens 3 is optimized with respect to the thickness $t_1$ of the first transparent substrate 6a so that the light having the first wavelength is well converged on the data recording surface 6b, and a combination of the auxiliary lens 5 and the objective lens 3 is optimized with respect to the thickness $t_2$ of the second transparent substrate 7a so that the light having the second wavelength is well converged on the second data recording surface 7b.

In other words, in the combination of the auxiliary lens 5 and the objective lens 3 in FIG. 4, correction of the aberration is properly carried out with respect to the first wavelength, the object-image distance and the thickness $t_1$ of the first transparent substrate 6a, and the aberration characteristics of the optical system for recording or reading the first optical disk 6 by using the light having the first wavelength are optimized either in off-axial or on-axial. Further, in the combination of the auxiliary lens 5 and the objective lens 3 in FIG. 4, correction of the aberration is properly carried out with respect to the second wavelength, the object-image distance and the thickness $t_2$ of the second transparent substrate 7a, and the aberration characteristics of the optical system for recording or reading the second optical disk 7 by using the light having the second wavelength are optimized either in off-axial or on-axial. The auxiliary lens 5 is so determined that the aberration becomes optimum when used in combination with the objective lens 3.

In the optical device shown in FIG. 5, the objective lens 3 is optimized with respect to the thickness $t_1$ of the first transparent substrate 6a so that the light having the first wavelength is well converged on the first data recording surface 6b, and the objective lens 3 is optimized with respect to the thickness $t_2$ of the second transparent substrate 7a so that the light having the second wavelength is well converged on the second data recording surface 7b.

In other words, in the objective lens 3 in FIG. 5, correction of the aberration is properly carried out with respect to the first wavelength, the object-image distance and the thickness $t_1$ of the first transparent substrate 6a, and the aberration characteristics of the optical system for recording or reading the first optical disk 6 by using the light having the first wavelength are optimized either in off-axial or on-axial. Further, in the objective lens 3 in FIG. 5, correction of the aberration is properly carried out with respect to the second wavelength, the object-image distance and the thickness $t_2$ of the second transparent substrate 7a, and the aberration characteristics of the optical system for recording or reading the second optical disk 7 by using the light having the second wavelength are optimized either in off-axial or on-axial. Thus, the recording or reading of the first optical disk 6 and the second optical disk 7 which differ in the thickness of their transparent substrates are well carried out. Further, the aberration characteristics are influenced by not only the thickness of the transparent substrates, but also the refractive index of the transparent substrates although the degree of influence is slight.

In the optical device shown in FIG. 4, it is preferable that a combination of an aspheric surface in the surface including the apex in a surface of the objective lens 3 (for instance, the aspheric surface 11a) and an aspheric surface in the surface including the apex in the other surface of the objective lens 3 (for instance, the aspheric surface 21a) and the optical system comprising the auxiliary lens 5, with respect to the light having the first wavelength, is so determined that the off-axial coma aberration in an image height of 0.05 mm is 0.03 $\lambda_1$ or less in RMS value when data in the data recording surface 6b of the first optical disk 6 are recorded or read, and a combination of an aspheric surface in the surface including the apex in the surface of the objective lens 3 (for instance, the aspheric surface 11a) and an aspheric surface in the surface including the apex in the other surface of the objective lens 3 (for instance, the aspheric surface 21a) and the optical system comprising the auxiliary lens 5, with respect to the light having the second wavelength, are so determined that the off-axial coma aberration in an image height of 0.05 mm is 0.03 $\lambda_2$ or less in RMS value when data in the data recording surface 7b of the second optical disk 7 are recorded or read.

In the optical device shown in FIG. 4, it is more preferable that a combination of each ringed belt-like aspheric surface in a surface of the objective lens 3 (for instance, the ringed belt-like aspheric surface 12a, 13a, 14a, 15a, 16a) and an aspheric surface in the surface including the apex in the other surface of the: objective lens 3 (for instance, the aspheric surface 21a) and the optical system comprising the auxiliary lens 5, with respect to the light having the first wavelength, are so determined that the off-axial coma aberration in an image height of 0.05 mm is 0.03 $\lambda_1$ or less in RMS value when data in the data recording surface 6b of the first optical disk 6 are recorded or read, and a combination of an aspheric surface in the surface including the apex in the surface of the objective lens 3 (for instance, the aspheric surface 11a) and each ringed belt-like aspheric surface in the other surface of the objective lens 3 (for instance, the ringed belt-like aspheric surface 22a, 23a, 24a, 25a, 26a, 27a) and the optical system comprising the auxiliary lens 5, with respect to the light having the second wavelength are so determined that the off-axial coma aberration in an image height of 0.05 mm is 0.03 $\lambda_2$ or less in RMS value when data in the data recording surface 7b in the second optical disk 7 are recorded or read.

In the optical device shown in FIG. 5, it is preferable that a combination of an aspheric surface in the surface including the apex in a surface of the objective lens 3 (for instance, the aspheric surface 11a) and an aspheric surface in the surface including the apex in the other surface of the objective lens 3 (for instance, the aspheric surface 21a) with respect to the light having the first wavelength is so determined that the off-axial coma aberration in an image height of 0.05 mm is 0.03 $\lambda_1$ or less in RMS value when data in the data recording surface 6b of the first optical disk 6 are recorded or read, and a combination of an aspheric surface in the surface including the apex in the surface of the objective lens 3 (for instance, the aspheric surface 11a) and an aspheric surface in the surface including the apex in the other surface of the objective lens 3 (for instance, the aspheric surface 21a) is so determined that the off-axial coma aberration in an image height of 0.05 mm is 0.03 $\lambda_2$ or less in RMS value when data in the data recording surface 7b of the second optical disk 7 are recorded or read.

In the optical device shown in FIG. 5, it is more preferable that a combination of each ringed belt-like aspheric surface in the surface of the objective lens 3 (for instance, the ringed belt-like aspheric surfaces 12a, 13a, 14a, 15a, 16a) and an aspheric surface in the surface including the apex in the other surface of the objective lens 3 (for instance, the aspheric surface 21a) with respect to the light having the first wavelength is so determined that the off-axial coma aberration in an image height of 0.05 mm is 0.03 $\lambda_1$ or less in RMS value when data in the data recording surface 6b of the first optical disk 6 are recorded or read, and a combination of an aspheric surface in the surface including the apex in the surface of the objective lens 3 (for instance, the aspheric surface 11a) and each ringed belt-like aspheric surface in the other surface of the objective lens 3 (for instance, the ringed belt-like aspheric surfaces 22a, 23a, 24a, 25a, 26a, 27a) with respect to the light having the second wavelength is so determined that the off-axial coma aberration in an image height of 0.05 mm is 0.03 $\lambda_2$ or less in RMS value when data in the data recording surface 7b of the second optical disk 7 are recorded or read.

When the off-axial coma aberration in an image height of 0.05 mm is 0.03 $\lambda$ or less, an allowable range in an inclination or a shift of axis from the optical axis of the light source, the auxiliary lens, the object lens or the optical disk is expanded to 0.1% or more in comparison with the case that the off-axial coma aberration is more than 0.03$\lambda$. A more preferable range of the off-axial coma aberration in an image height of 0.05 mm is 0.01$\lambda$ or less. In this case, an allowable range is expanded to 0.5% or more in comparison with the case that the off-axial coma aberration is more than 0.01$\lambda$.

When the lateral magnification in combination of the auxiliary lens 5 and the objective lens 3 which corresponds to a combination of the light having the first wavelength and the first transparent substrate 6a in the optical device shown in FIG. 4 is indicated by $\beta_1$, the lateral magnification of the objective lens 3 in combination which corresponds to a combination of the light having the first wavelength and the first transparent substrate 6a in the optical device shown in FIG. 5 is also indicated by $\beta_1$, the lateral magnification in combination of the auxiliary lens 5 and the objective lens 3 which corresponds to a combination of the light having the second wavelength and the second transparent substrate 7a in the optical device shown in FIG. 4 is indicated by $\beta_2$, and the lateral magnification of the objective lens 3 in combination which corresponds to a combination of the light having the second wavelength and the second transparent substrate 7a in the optical device shown in FIG. 5 is also indicated by $\beta_2$, it is preferable that both conditions described in the following Formulae (A) and (B) are satisfied.

$$0.05 \leq |\beta_1| \leq 0.3, \quad (A)$$

and $$0.05 \leq |\beta_2| \leq 0.3 \quad (B)$$

In a case that $0.05 \leq |\beta_1|$ and $0.05 \leq |\beta_2|$ are not satisfied, the object-image distance becomes too long so that miniaturization of the optical device becomes difficult. Further, in a case that $|\beta_1| \leq 0.3$ and $|\beta_2| \leq 0.3$ are not satisfied, correction of the aberration becomes difficult.

Further, in the optical device shown in FIG. 4, it is preferable that the distance $S_1$ on the optical axis from the light source 1 to the surface, at a side of the light source 1, of the auxiliary lens 5 is 8 mm $\leq S_1 \leq$ 25 mm. When $S_1$ is less than 8 mm, correction of the aberration becomes difficult. On the other hand, when $S_1$ exceeds 25 mm, miniaturization of the optical device becomes difficult.

As an example of the optical medium 2, there are a beam splitter, half mirror, prism and so on, for example. In the optical device shown in FIGS. 4 and 5, the optical medium 2 may not be provided so that light from the light source 1 is incident directly to the objective lens 3.

Further, means for supplying data in the data recording surface of the optical disk to the light receiving element are not limited to those as shown in FIGS. 4 and 5.

The aperture 9 functions to change a numerical aperture (NA). The reason why the aperture is provided is that when a numerical aperture used for the first optical disk 6 is different from a numerical aperture for the second optical disk 7 in recording or reading, the numerical apertures have to be adjusted by the aperture 9. When a numerical aperture used for the first optical disk 6 is the same as a numerical aperture for the second optical disk 7, the aperture 9 is generally unnecessary. As to the aperture 9, there is a mechanical aperture and an optical aperture, which is, however, not limited thereto.

When $NA_1 > NA_2$ is established between a numerical aperture $NA_1$ of the objective lens used for the first optical disk and a numerical aperture $NA_2$ of the objective lens used for the second optical disk, a step portion may be provided, instead of the aperture 9, in a ringed belt-like region having the center coincident with the optical axis, in a or both surfaces of the objective lens to prevent the light having the second wavelength from passing through to thereby throttle the light to the numerical aperture $NA_2$.

In FIG. 4, the auxiliary lens 5 is constituted by a single lens. However, the auxiliary lens 5 is not limited to have such structure, and it may comprise a plurality of lenses.

In the above, description has been made as to recording or reading two kinds of optical disk. However, the present invention is not limited thereto and recording or reading can be conducted to three or more kinds of optical disk wherein the thickness of these transparent substrates are all different. Further, the optical disks used in the present invention are not limited to DVD or CD but may be another kind of optical disk.

In the optical device shown in FIG. 5 and 5, light having the first wavelength and light having the second wavelength are emitted from a single light source 1. However, the present invention is not limited thereto and light sources for emitting the light having the first wavelength and the light having the second wavelength may be provided separately.

Generally, a synthetic resin is used as materials for the auxiliary lens 5 and the objective lens 4. The materials are not limited to synthetic resin, and glass may be used. Further, an autofocusing driving means may be provided for the objective lens in the optical device of the present invention.

Now, the present invention will be described in detail with reference to Examples. However, it should be understood that the present invention is by no means restricted by such specific examples.

EXAMPLE

An optical device as shown in FIG. 4 was prepared on the premise of recording or reading CD and DVD wherein. DVD ($t_1$=0.60 mm) was used as the first optical disk 6 and CD ($t_2$=1.20 mm) was used as the second optical disk 7.

A laser light source for emitting light having a wavelength of 650 nm was used for reading or recording DVD and a laser light source for emitting light having a wavelength of 780 nm was used for reading or recording CD. As the optical medium 2, a beam splitter made of a material of BK and having a thickness 3.00 mm was used. The transparent substrate of DVD was designed to have a refractive index of 1.580 with the wavelength of 650 nm. The transparent substrate of CD was designed to have a refractive index of 1.573 with the wavelength of 780 nm.

The shape of the aspheric surfaces formed in the objective lens 3 including each ringed belt-like aspheric surface was determined according to the following Formula 5. In Formula 5, i is 2, 4, 6, 8 or 10; j is 1 or 2; h is a height from the optical axis; $z_j$ is a distance from a surface contact with the apex of the j th aspheric surface to a point having a height h on the aspheric surface, and $r_j$, $k_j$, $a_{i,j}$ is the coefficient of the j th surface respectively.

$$Z_j = (1/r_j)h^2/[1+\{1-(1+k_j)(1/r_j)^2 h^2\}^{0.5}] + \Sigma_i a_{i,j} h^i \quad \text{Formula 5}$$

Example 1

Comparative Example

Figure 6:
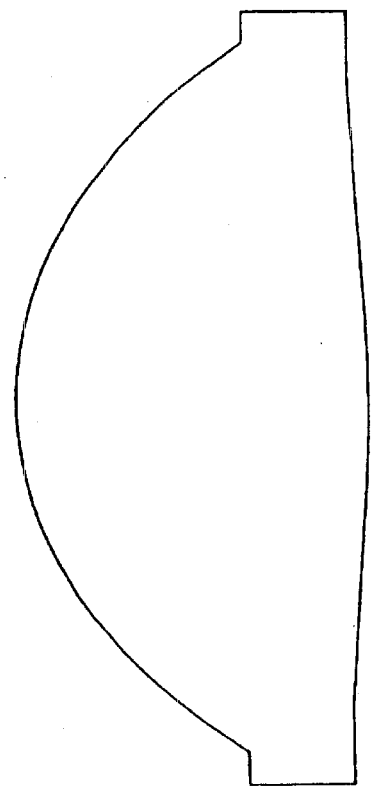
FIG. 6 is a cross-sectional view showing an objective lens according to Example 1.

The shape of the objective lens 3 was such shape as shown in FIG. 6. For either CD or DVD, designing was conducted so that the on-axial spherical aberration was not corrected but the off-axial coma aberration was well corrected.

Specifications and numerical values of the optical device and the objective lens in Example 1 are shown in the first left and right frames of Table 1. In the first left and right frames of Table 1, $f_1$ indicates the focal distance of the objective lens 3 at a wavelength of 650 nm, $f_2$ indicates the focal distance of the objective lens 3 at a wavelength of 780 nm, $d_1$ indicates the thickness of the center of the objective lens 3, $n_1$ indicates the refractive index of the objective lens 3 at a wavelength of 650 nm, and $n_2$ indicates a refractive index of the objective lens 3 at a wavelength of 780 nm. Coefficients of the aspheric surface in the first surface of the objective lens in Example 1 are shown in the second left and right frames of Table 1, and coefficients of the aspheric surface in the second surface of the objective lens are shown in the third left and right frames of Table 1. In Tables described Hereinbelow, E-1 means $10^{-1}$.

TABLE 1

| | |
|---|---|
| $f_1$ = 3.012 mm | $d_1$ = 2.00 mm |
| $f_2$ = 3.029 mm | $n_1$ = 1.5407 |
| $NA_1$ = 0.650 | $n_2$ = 1.5373 |
| $NA_2$ = 0.520 | |
| $r_1$ = 1.187772 | $a_{2,1}$ = −1.6523514E−1 |
| $k_1$ = −1.021764 | $a_{4,1}$ = 1.060931E−2 |
| | $a_{6,1}$ = 2.2752525E−3 |
| | $a_{8,1}$ = −2.8099645E−4 |
| $r_2$ = 5.802628 | $a_{2,2}$ = 6.0824628E−3 |
| $k_2$ = −10 | $a_{4,2}$ = 2.9551156E−2 |
| | $a_{6,2}$ = −8.942353E−3 |
| | $a_{8,2}$ = 9.3159944E−4 |

A collimater lens was used as the auxiliary lens and the shape of the aspheric surface of the auxiliary lens was determined according to Formula 5. Coefficients of the aspheric surface of the auxiliary lens are shown in upper frames of Table 2. In the upper frames of Table 2, $f_{c1}$ indicates the focal distance at a wavelength of 650 nm, $f_{c2}$ indicates the focal distance at a wavelength of 780 nm $d_c$ indicates the thickness at the center, $n_{c1}$ indicates the refractive index at a wavelength of 650 nm, and $n_{c2}$ indicates the refractive index at a wavelength of 780 nm. In Examples 2–5, the auxiliary lens as indicated in the upper frames of Table 2 was also used.

Specifications of the auxiliary lens as in the upper frames and the optical system comprising the objective lens in Table 1 are indicated in lower frames of Table 2. In the lower frames of Table 2, $P_1$ indicates the distance (operating distance) between the second surface of the objective lens and the surface at an objective lens side of the first optical disk 6 at a wavelength of 650 nm, and $P_2$ indicates the distance (operating distance) between the second surface of the objective lens and the surface at an objective lens side of the second optical disk.

TABLE 2

| | |
|---|---|
| $f_{C1}$ = 18.00 mm | $r_1$ = 37.05092 |
| $f_{C2}$ = 18.11 mm | $r_2$ = 12.43312 |
| $d_C$ = 2.45 mm | $k_1$ = 19.57529 |
| $n_{C1}$ = 1.5407 | $k_2$ = 1.007722 |
| $n_{C2}$ = 1.5373 | $a_{2,1}$ = −2.0747579E−3 |
| $S_1$ = 17.75 mm | $a_{2,2}$ = −5.3709741E−4 |
| $S_2$ = 5.25 mm | $a_{4,1}$ = 8.7133794E−5 |
| | $a_{4,2}$ = 1.215691E−4 |
| | $a_{6,1}$ = 0.0 |
| | $a_{6,2}$ = 0.0 |
| | $a_{8,1}$ = 0.0 |
| | $a_{8,2}$ = 0.0 |

| | Optical system for CD | Optical system for DVD |
|---|---|---|
| Aperture (diameter) | 3.16 mm | 3.94 mm |
| Lateral magnification of optical system ($\beta_1$, $\beta_2$) | −0.168 | −0.167 |
| $P_1$, $P_2$ | 1.20 mm | 1.55 mm |

Figure 9:
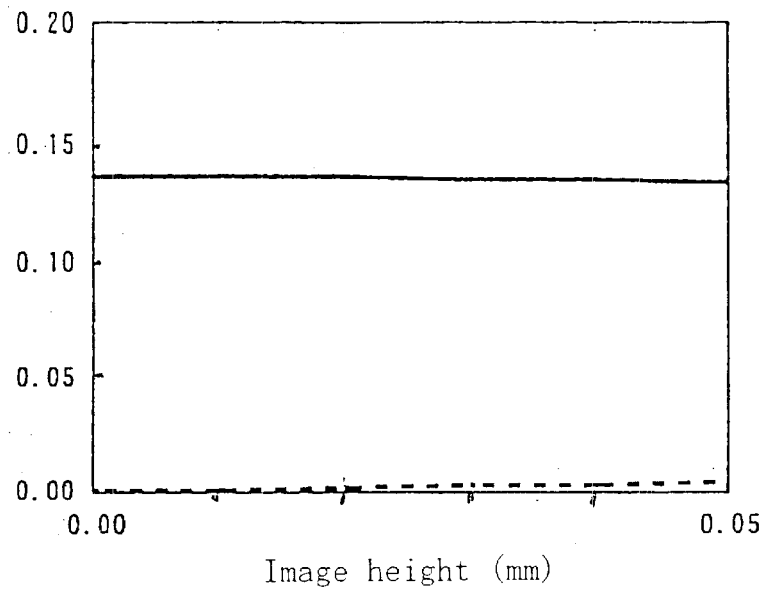
FIG. 9 is an off-axial wavefront aberration characteristic diagram of an optical system for CD in Example 1.
Figure 10:
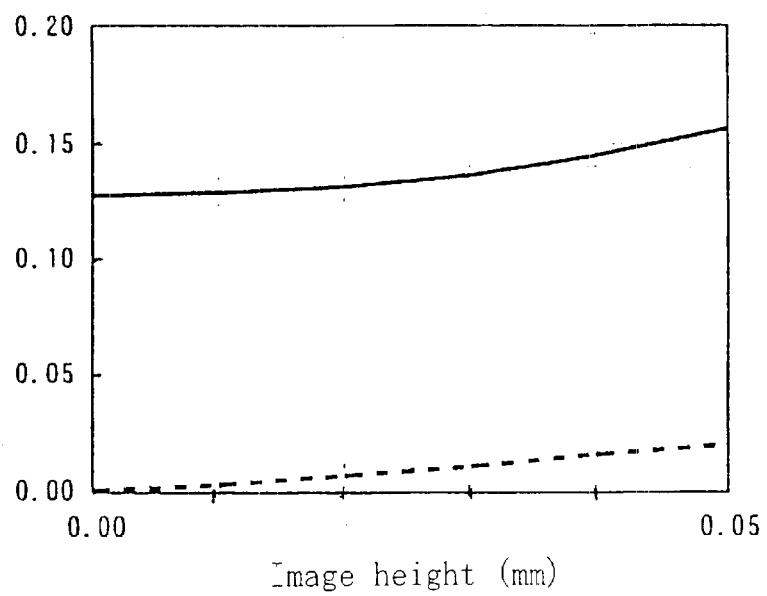
FIG. 10 is an off-axial wavefront aberration characteristic diagram of an optical system for DVD in Example 1.

FIG. 9 shows the off-axial wavefront aberration characteristics of the optical system for CD. In FIG. 9, a solid line shows a wavefront aberration including all kinds of aberration. A broken line shows only an off-axial coma aberration in the off-axial wavefront aberration. FIG. 10 shows the off-axial wavefront aberration characteristics of the optical system for DVD. The solid line and the broken line have the same meaning as in FIG. 9. Further, in the aberration characteristic diagrams described hereinbelow, solid lines and broken lines have the same meaning as in FIG. 9. The aberration characteristic diagrams on each Example and aberration values in Tables described after one all based on calculated values. The objective lens of Example 1 and an auxiliary lens were prepared by injection-molding a plastic material, and the optical device of FIG. 4 was fabricated. When recording or reading was conducted to DVD and CD with this optical device, accurate recording or reading could not be performed for both DVD and CD.

Example 2

Comparative Example

Figure 7:
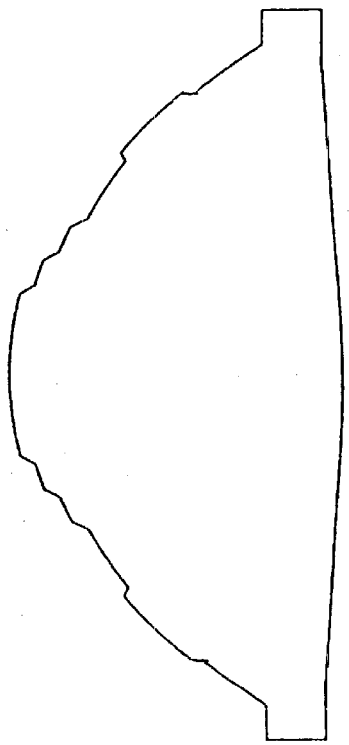
FIG. 7 is a cross-sectional view showing an objective lens according to Example 2.

An objective lens was formed to have such shape as shown in FIG. 7 wherein specifications of the lens were the same as those of Example 1 as described in the first left and right frames of Table 1, which are basic specifications. A first phase shifter was provided in a first surface of the objective lens in order to correct the on-axial spherical aberration for DVD. The shape of the first surface of the objective lens was the same as the first surface of the objective lens as shown in FIG. 1, and the second surface of the objective lens was the same as the second surface of the objective lens of Example 1. In the following, an aspheric surface in the first surface of the objective lens will be described by using the same reference numerals as in FIG. 1.

An aspheric surface 11a in the surface including the apex in the first surface of the objective lens was formed in the same manner as the aspheric surface in the surface including the apex in the first surface of the objective lens of Example 1. The second surface of the objective lens 3 was formed in the same manner as the second surface of the objective lens of Example 1. Coefficients of aspheric surface of a ringed belt-like aspheric surface 12a are shown in an upper column of Table 3; coefficients of the aspheric surface of ringed belt-like aspheric surfaces 13a, 15a are shown in a middle column of Table 3, and coefficients of aspheric surface of ringed belt-like aspheric surfaces 14a, 16a are shown in a lower column of Table 3. Further, each head $\beta_1$ is described in an upper right column of Table 4. Further, $\Phi_{11}$, $\Phi_{12}$, $\Phi_{13}$, $\Phi_{14}$, $\Phi_{15}$ and $\Phi_{16}$ are shown in a lower right column of Table 4.

TABLE 3

$r_1 = 1.187356552$
$k_1 = -1.021764$
$a_{2.1} = -1.65317E-1$
$a_{4.1} = 1.061871E-2$
$a_{6.1} = 2.278461E-3$
$a_{8.1} = -2.816025E-4$
$r_1 = 1.187346402$
$k_1 = -1.021764$
$a_{2.1} = 1.65255E-1$
$a_{4.1} = 1.062638E-2$
$a_{6.1} = 2.281704E-3$
$a_{8.1} = -2.822107E-4$
$r_1 = 1.186607004$
$k_1 = -1.021764$
$a_{2.1} = -1.654518E-1$
$a_{4.1} = 1.06371E-2$
$a_{6.1} = 2.284899E-3$
$a_{8.1} = -2.828179E-4$

TABLE 4

| | |
|---|---|
| Head $\gamma_{11}$ of ring-like step portion 11 | 1.45 μm |
| Head $\gamma_{12}$ of ring-like step portion 12 | 2.90 μm |
| Head $\gamma_{13}$ of ring-like step portion 13 | 4.35 μm |
| Head $\gamma_{14}$ of ring-like step portion 14 | 2.90 μm |
| Head $\gamma_{15}$ of ring-like step portion 15 | 4.35 μm |
| $\Phi_{11}$ | 1.10 mm |
| $\Phi_{12}$ | 1.48 mm |
| $\Phi_{13}$ | 1.92 mm |
| $\Phi_{14}$ | 2.68 mm |
| $\Phi_{15}$ | 3.50 mm |
| $\Phi_{16}$ | 3.97 mm |

Figure 11:
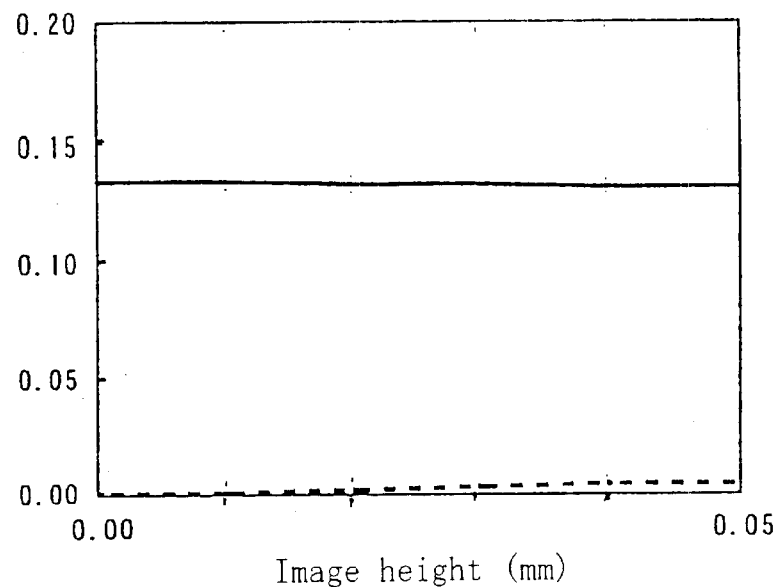
FIG. 11 is an off-axial wavefront aberration characteristic diagram of an optical system for CD in Example 2.
Figure 12:
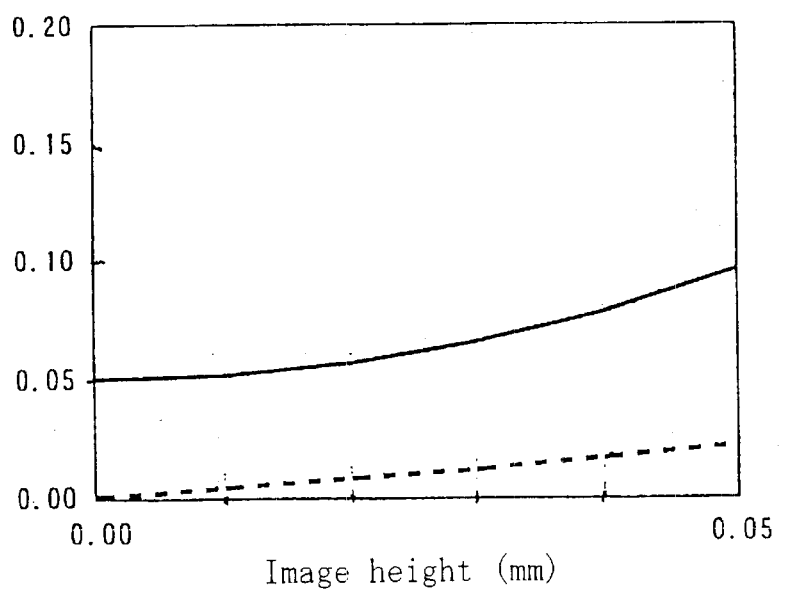
FIG. 12 is an off-axial wavefront aberration characteristic diagram of an optical system for DVD in Example 2.

FIG. 11 shows the off-axial wavefront aberration characteristics of the optical system for CD. FIG. 12 shows the off-axial wavefront aberration characteristics of the optical system for DVD. The objective lens having the shape as shown in Example 2 and the auxiliary lens 5 were prepared by injection-molding a plastic material, and the optical device of FIG. 4 was fabricated. When recording or reading was conducted to DVD and CD with this optical device, accurate recording or reading could not be performed for CD although accurate recording or reading could be performed for DVD.

Example 3

Comparative Example

Figure 8:
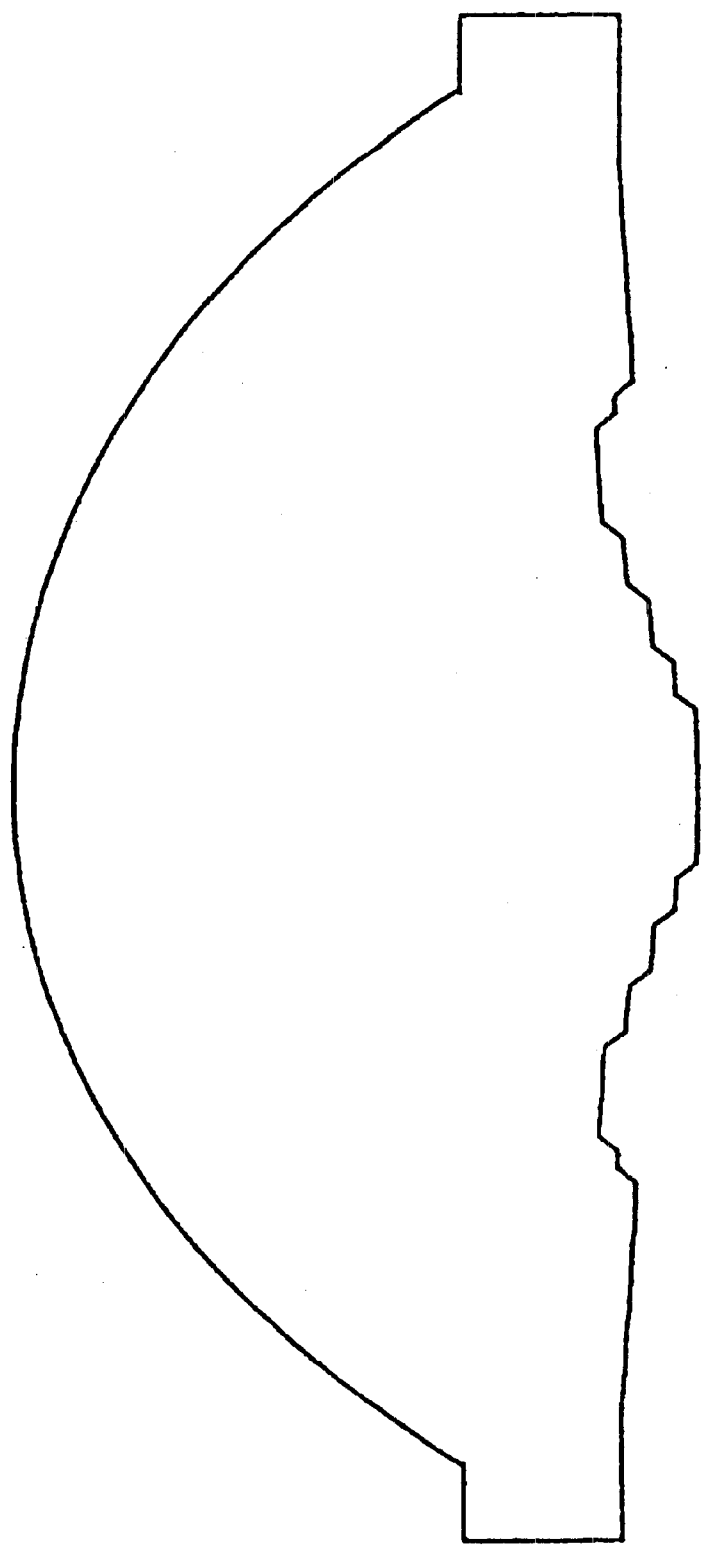
FIG. 8 is a cross-sectional view showing an objective lens according to Example 3.

An objective lens was prepared to have such shape of lens as shown in FIG. 8 wherein specifications of the lens were the same as those of Example 1 described in the first left and right frames of Table 1, which are basic specification. A second phase shifter was provided in the second surface of the objective lens in order to correct the on-axial spherical aberration for CD. The second surface of the objective lens was such shape as that of the second surface of the objective lens shown in FIG. 1, and the first surface of the objective lens was formed in the same manner as the first surface in the objective lens of Example 1. In the following, the aspheric surface in the second surface of the objective lens will be described by using the reference numerals as in FIG. 1.

An aspheric surface 21a in the surface including the apex in the second surface of the objective lens was formed in the same manner as the aspheric surface in the surface including the apex in the first surface of the objective lens. An aspheric surface 11a in the surface including the apex in the first surface of the objective lens was formed in the same manner as the aspheric surface in the surface including the apex in the first surface of the objective lens of Example 1.

Coefficients of aspheric surface of a ringed belt-like aspheric surface 22a are shown in the upper left frame of Table 5; coefficients of aspheric surface of the ringed belt-like aspheric surfaces 23a, 27a are shown in the upper right frame of Table 5; coefficients of aspheric surface of ringed belt-like aspheric surfaces 24a, 26a are shown in the lower left frame of Table 5, and coefficients of aspheric surface of a ringed belt-like aspheric surface 25a are shown in a lower right frame of Table 5.

Further, each head $\beta_2$ is shown in the upper right column of Table 6, and $\Phi_{21}$, $\Phi_{22}$, $\Phi_{23}$, $\Phi_{24}$, $\Phi_{25}$ and $\Phi_{26}$ are shown in the lower right column of Table 6.

TABLE 5

| | |
|---|---|
| $r_2 = -6.2025351$ | $r_2 = -5.960583851$ |
| $k= -10$ | $k_2 = -10$ |
| $a_{2.2} = 7.037623E-4$ | $a_{2.2} = 4.121361E-3$ |
| $a_{4.2} = 3.046768E-2$ | $a_{4.2} = 2.983039E-2$ |
| $a_{6.2} = -9.073626E-3$ | $a_{6.2} = -8.963419E-3$ |
| $a_{8.2}$ 9.416602E-4 | $a_{8.2} = 9.314379E-4$ |
| $r_2 = -6.277223534$ | $r_2 = -6.344678464$ |
| $k_2 = -10$ | $k_2 = -10$ |
| $a_{2.2} = 6.027714E-5$ | $a_{2.2} = -6.281483E-4$ |
| $a_{4.2} = 3.048556E-2$ | $a_{4.2} = 3.055276E-2$ |
| $a_{6.2} = -9.050586E-3$ | $a_{6.2} = -9.04747E-3$ |
| $a_{8.2} = 9.375883E-4$ | $a_{8.2} = 9.362317E-4$ |

TABLE 6

| | |
|---|---|
| Head $\gamma_{21}$ of ring-like step portion 21 | 1.20 μm |
| Head $\gamma_{22}$ of ring-like step portion 22 | 2.40 μm |
| Head $\gamma_{23}$ of ring-like step portion 23 | 3.61 μm |
| Head $\gamma_{24}$ of ring-like step portion 24 | 4.81 μm |
| Head $\gamma_{25}$ of ring-like step portion 25 | 3.61 μm |
| Head $\gamma_{26}$ of ring-like step portion 26 | 2.40 μm |
| $\Phi_{21}$ | 0.46 mm |
| $\Phi_{22}$ | 0.78 mm |
| $\Phi_{23}$ | 1.13 mm |
| $\Phi_{24}$ | 1.49 mm |
| $\Phi_{25}$ | 2.17 mm |
| $\Phi_{26}$ | 2.32 mm |
| $\Phi_{27}$ | 3.56 mm |

Figure 13:
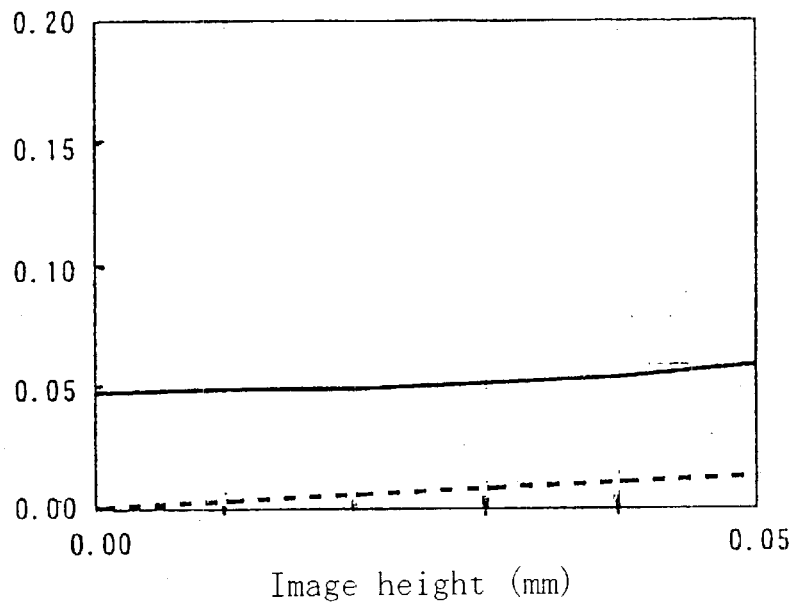
FIG. 13 is an off-axial wavefront aberration characteristic diagram of an optical system for CD in Example 3.
Figure 14:
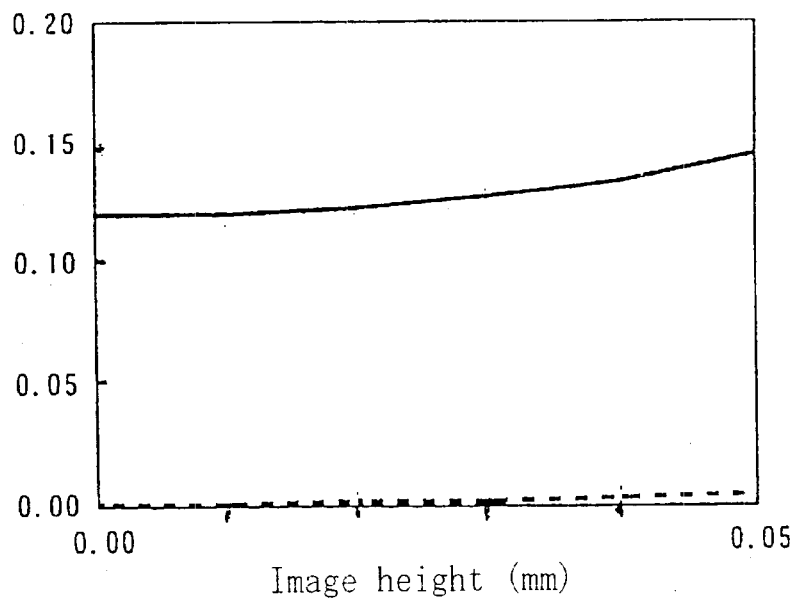
FIG. 14 is an off-axial wavefront aberration characteristic diagram of an optical system for DVD in Example 3.

FIG. 13 shows the off-axial wavefront aberration characteristics of the optical system for CD. FIG. 14 shows the off-axial wavefront aberration characteristics of the optical system for DVD. An objective lens having the shape of Example 3 and an auxiliary lens were prepared, and the optical device of FIG. 4 was fabricated. When recording or reading was conducted to DVD and CD with this optical device, accurate recording or reading could not be performed for DVD although accurate recording or reading could be performed for CD.

Example 4

Example

An objective lens was formed to have such shape of lens as shown in FIG. 1 wherein specifications of the lens were the same as those of Example 1 described in the first left and right frames of Table 1, which are basic specification. The first surface of the objective lens was formed in the same manner as the first surface of the objective lens in Example 2, and the second surface of the objective lens was formed in the same manner as the second surface of the objective lens in Example 3.

Figure 15:
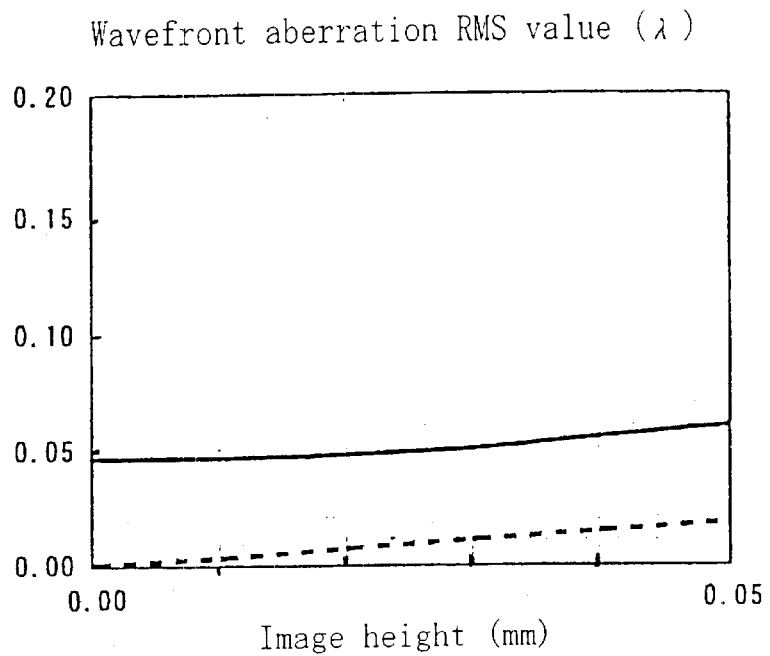
FIG. 15 is an off-axial wavefront aberration characteristic diagram of an optical system for CD in Example 4.
Figure 16:
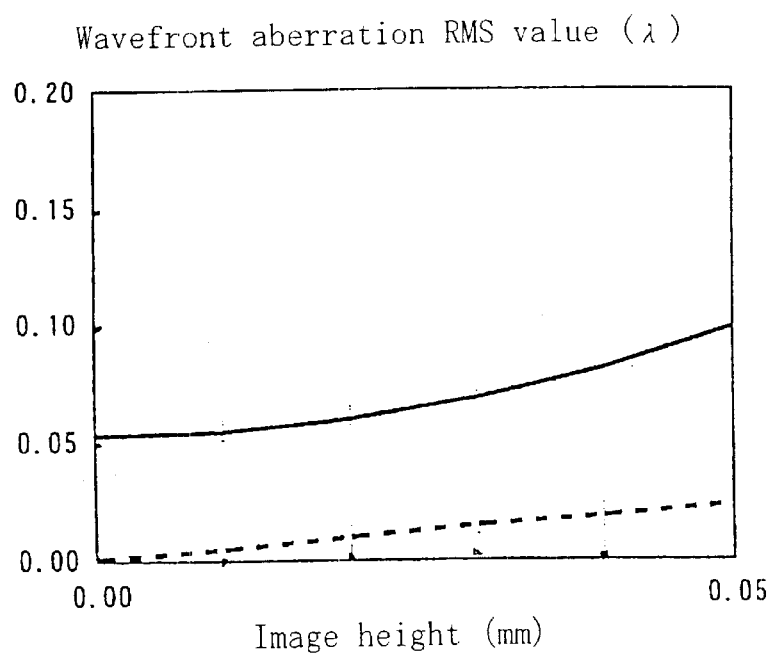
FIG. 16 is an off-axial wavefront aberration characteristic diagram of an optical system for DVD in Example 4.

FIG. 15 shows the off-axial wavefront aberration characteristics of the optical system for CD. FIG. 16 shows the off-axial wavefront aberration characteristics of the optical device for DVD. An objective lens having the same shape as in Example 4 and an auxiliary lens were prepared and the optical device of FIG. 4 was fabricated. When recording or reading was conducted to CD and DVD with this optical device, accurate recording or reading could be performed for both CD and DVD.

Example 5

EXAMPLE

An objective lens having the shape as shown in FIG. 1 was designed wherein specifications of the objective lens were the same as those in Example 1 described in the first left and right frames of Table 1, which are the basic specification.

Coefficients of aspheric surface of an aspheric surface $11a$ are shown in an upper left frame of Table 7; coefficients of aspheric surface of a ringed belt-like aspheric surface $12a$ are shown in an upper right frame of Table 7; coefficients of aspheric surface of a ringed belt-like aspheric surface $13a$ are shown in a middle left frame of Table 7; coefficients of aspheric surface of a ringed belt-like aspheric surface $14a$ are shown in a middle right frame of Table 7; coefficients of aspheric surface of a ringed belt-like aspheric surface $15a$ are shown in a lower left frame of Table 7, and coefficients of aspheric surface of a ringed belt-like aspheric surface $16a$ are shown in a lower right frame of Table 7 respectively.

TABLE 7

| | |
|---|---|
| $r_1 = 1.186966$ | $r_1 = 1.1869361$ |
| $k_1 = 1.021764$ | $k_1 = -1.021764$ |
| $a_{2,1} = -1.65039E-1$ | $a_{2,1} = -1.6517677E-1$ |
| $a_{4,1} = 1.0967235E-2$ | $a_{4,1} = 1.0746695E-2$ |
| $a_{6,1} = 2.5768064E-3$ | $a_{6,1} = 2.2932601E-3$ |
| $a_{8,1} = -1.2901136E-3$ | $a_{8,1} = -6.6819358E-4$ |
| $r_1 = 1.1872281$ | $r_1 = 1.186582$ |
| $k_1 = -1.021764$ | $k_1 = -1.021764$ |
| $a_{2,1} = -1.6521502E-1$ | $a_{2,1} = -1.6544294E-1$ |
| $a_{4,1} = 1.0670918E-2$ | $a_{4,1} = 1.0632515E-2$ |
| $a_{6,1} = 2.3099968E-3$ | $a_{6,1} = 2.2738951E-3$ |
| $a_{8,1} = -2.9605177E-4$ | $a_{8,1} = -2.9516419E-4$ |
| $r_1 = 1.1874106$ | $r_1 = 1.1866318$ |
| $k_1 = -1.021764$ | $k_1 = -1.021764$ |
| $a_{2,1} = -1.6527676E-1$ | $a_{2,1} = -1.6545995E-1$ |
| $a_{4,1} = 1.0623504E-2$ | $a_{4,1} = 1.0636869E-2$ |
| $a_{6,1} = 2.2839713E-3$ | $a_{6,1} = 2.2852066E-3$ |
| $a_{8,1} = -2.797455E-4$ | $a_{8,1} = -2.8267783E-4$ |

Coefficients of aspheric surface of a aspheric surface $21a$ are shown in the first left frame of Table 8; coefficients of aspheric surface of a ringed belt-like aspheric surface $22a$ are shown in the first right frame of Table 8; coefficients of aspheric surface of a ringed belt-like aspheric surface $23a$ are shown in the second left frame of Table 8; coefficients of aspheric surface of a ringed belt-like aspheric surface $24a$ are shown in the second right frame of Table 8; coefficients of aspheric surface of a ringed belt-like aspheric surface $25a$ are shown in the third left frame of Table 8; coefficients of aspheric surface of a ringed belt-like aspheric surface $26a$ are shown in the third right frame of Table 8, and coefficients of aspheric surface of a ringed belt-like aspheric surface $2a$ are shown in the fourth left frame of Table 8.

TABLE 8

| | |
|---|---|
| $r_2 = -5.794755$ | $r_2 = -6.2101203$ |
| $k_2 = -10$ | $k_2 = -10$ |
| $a_{2,2} = 6.9244227E-3$ | $a_{2,2} = 7.8886278E-4$ |
| $a_{4,2} = 6.8119378E-2$ | $a_{4,2} = 3.2698967E-2$ |
| $a_{6,2} = 3.3090099E-1$ | $a_{6,2} = 1.2846482E-2$ |
| $a_{8,2} = -9.6604777$ | $a_{8,2} = 1.6114992E-1$ |
| $r_2 = -5.9780396$ | $r_2 = -6.2821263$ |
| $k_2 = -10$ | $k_2 = -10$ |
| $a_{2,2} = 4.3222523E-3$ | $a_{2,2} = 6.6344241E-5$ |
| $a_{4,2} = 3.0242835E-2$ | $a_{4,2} = 3.0533915E-2$ |
| $a_{6,2} = -8.7580642E-3$ | $a_{6,2} = -9.0252024E-3$ |
| $a_{8,2} = -2.3033156E-3$ | $a_{8,2} = 7.9337943E-4$ |
| $r_2 = -6.3396449$ | $r_2 = -6.2815447$ |
| $k_2 = -10$ | $k_2 = -10$ |
| $a_{2,2} = 6.822114E-4$ | $a_{2,2} = 9.9277163E-5$ |
| $a_{4,2} = 3.0542058E-2$ | $a_{2,2} = 3.0487006E-2$ |
| $a_{6,2} = 9.0310309E-3$ | $a_{6,2} = -9.0719149E-3$ |
| $a_{8,2} = 9.5839266E-4$ | $a_{8,2} = 9.0427612E-4$ |
| $r_2 = -5.9610269$ | |
| $k_2 = -10$ | |
| $a_{2,2} = 4.1216563E-3$ | |
| $a_{4,2} = 2.9827022E-2$ | |
| $a_{6,2} = -8.9647704E-3$ | |
| $a_{8,2} = 9.3113381E-4$ | |

Figure 17:
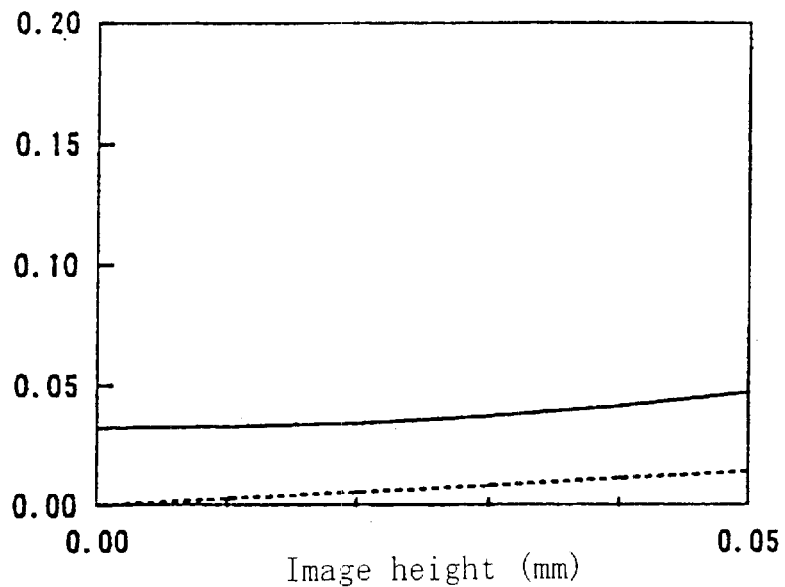
FIG. 17 is an off-axial wavefront aberration characteristic diagram of an optical system for CD in Example 5.
Figure 18:
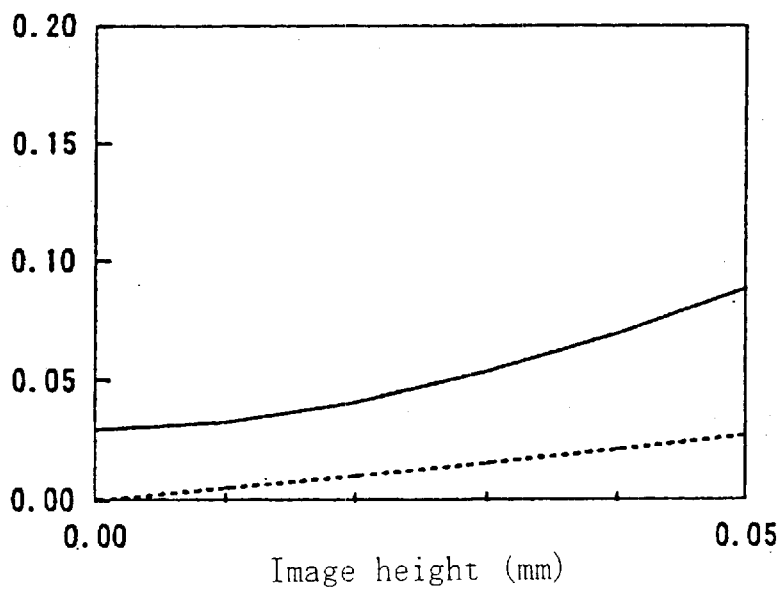
FIG. 18 is an off-axial wavefront aberration characteristic diagram of an optical system for DVD in Example 5.

Specifications which are not described in Table 7 and Table 8 were determined in the same manner as in Example 4. FIG. 17 shows the off-axial wavefront aberration characteristics of the optical system for CD. FIG. 18 shows the off-axial wavefront aberration characteristics of the optical system for DVD. An objective lens having the same shape as in Example 5 and an auxiliary lens were prepared, and the optical device of FIG. 4 was fabricated. When recording or reading was conducted to CD and DVD with this optical device, accurate recording or reading could be performed for both CD and DVD.

Example 6

EXAMPLE

An objective lens used for the optical device (of a finite type) shown in FIG. 5 was designed wherein 7 ringed belt-like aspheric surfaces were formed in the plane at a side of the light source, and 6 ringed belt-like aspheric surfaces were formed in the surface at a side of the optical disks.

The objective lens was designed so that the off-axial coma aberration was excellent for either CD or DVD. The 7 ringed belt-like aspheric surfaces formed in the first surface were for phase correction for CD so that the on-axial characteristics were corrected, and the 6 ringed belt-like aspheric surfaces formed in the second surface were for correcting the on-axial spherical aberration for DVD. Table 9 shows basic specifications of the objective lens. Specifications such as wavelength which are not described in Table 9 are the same as in Example 4.

TABLE 9

| | |
|---|---|
| $f_1 = 2.56$ mm | $d_1 = 2.00$ mm |
| $f_2 = 2.57$ mm | $n_1 = 1.5407$ |
| $NA_1 = 0.651$ | $n_2 = 1.5373$ |
| $NA_2 = 0.521$ | |

| | Optical system for CD | Optical system for DVD |
|---|---|---|
| Aperture (diameter) | 2.95 mm | 3.67 mm |
| Lateral magnification of optical system | −0.141 | −0.141 |

TABLE 9-continued

| ($\beta_1$, $\beta_2$) | | |
|---|---|---|
| $P_1$, $P_2$ | 1.21 mm | 1.55 mm |
| Object-image distance | 24.66 mm | 24.40 mm |

When an aspheric surface in the surface including the apex in the surface, at a side of the light source, of the objective lens 3 is referred to as a light source side apex aspheric surface; a ringed belt-like aspheric surface nearest to the light source side apex aspheric surface is referred to as a first light source side ringed belt-like aspheric surface, and ringed belt-like aspheric surfaces formed successively from the first light source side ringed belt-like aspheric surface toward an outer periphery of the objective lens are referred to a second light source side ringed belt-like aspheric surface, a third light source side ringed belt-like aspheric surface, . . . respectively, coefficients of aspheric surface of the light source side apex aspheric surface are shown in the first left frame of Table 10; coefficients of aspheric surface of the first light source side ringed belt-like aspheric surface are shown in the first right frame of Table 10; coefficients of aspheric surface of the second light source side ringed belt-like aspheric surface are shown in the second left frame of Table 10; coefficients of aspheric surface of the third light source side ringed belt-like aspheric surface 24a are shown in the second light frame of Table 10; coefficients of aspheric surface of the fourth light source side ringed belt-like aspheric surface 25a are shown in the third left frame of Table 10; coefficients of aspheric surface of the fifth light source side ringed belt-like aspheric surface 26a are shown in the third right frame of Table 10, and coefficients of aspheric surface of the sixth light source side ringed belt-like aspheric surfaces 2a are shown in the fourth left frame of Table 10 respectively.

TABLE 10

| | |
|---|---|
| $r_1$ = 1.233515 | $r_1$ = 1.1634129 |
| $k_1$ = −1.0 | $k_1$ = −1.0 |
| $a_{2.1}$ = −1.3150492E-1 | $a_{2.1}$ = −1.558908E-1 |
| $a_{4.1}$ = 7.2179622E-3 | $a_{4.1}$ = 7.225168E-3 |
| $a_{6.1}$ = 2.3729098E-3 | $a_{6.1}$ = 2.374128E-3 |
| $a_{8.1}$ = −4.934695E-4 | $a_{8.1}$ = −4.940307E-4 |
| $r_1$ = 1.1698054 | $r_1$ = 1.164662 |
| $k_1$ = −1.0 | $k_1$ = −1.0 |
| $a_{2.1}$ = −1.535026E-1 | $a_{2.1}$ = −1.53506E-1 |
| $a_{4.1}$ = 7.231035E-3 | $a_{4.1}$ = 7.236925E-3 |
| $a_{6.1}$ = 2.375854E-3 | $a_{6.1}$ = 2.377573E-3 |
| $a_{8.1}$ = −4.946562E-4 | $a_{8.1}$ = −4.952812E-4 |
| $r_1$ = 1.1626195 | $r_1$ = 1.164662 |
| $k_1$ = −1.0 | $k_1$ = −1.0 |
| $a_{2.1}$ = −1.560651E-1 | $a_{2.1}$ = −1.553506E-1 |
| $a_{4.1}$ = 7.242843E-3 | $a_{4.1}$ = 7.236925E-3 |
| $a_{6.1}$ = 2.379282E-3 | $a_{6.1}$ = 2.377573E-3 |
| $a_{8.1}$ = 4.959056E-4 | $a_{8.1}$ = −4.952812E-4 |
| $r_1$ = 1.1698054 | |
| $k_1$ = −1.0 | |
| $a_{2.1}$ = −1.535026E-1 | |
| $a_{4.1}$ = 7.231035E-3 | |
| $a_{6.1}$ = 2.375854E-3 | |
| $a_{8.1}$ = −4.946562E-4 | |

When an aspheric surface in the surface including the apex in the surface, at a side of the optical disks, of the objective lens 3 is referred to as an optical disk side apex aspheric surface; a ringed belt-like aspheric surface nearest to the optical disk side apex aspheric surface is referred to as a first optical disk side ringed belt-like aspheric surface, and ringed belt-like aspheric surfaces formed successively from the first optical disk side ringed belt-like aspheric surface toward an outer periphery of the objective lens are referred to as a second optical disk side ringed belt-like aspheric surface, a third optical disk side ringed belt-like aspheric surface, . . . respectively, coefficients of aspheric surface of the optical disk side apex aspheric surfaces are shown in the first left frame of Table 11; coefficients of aspheric surface of the first optical disk side ringed belt-like aspheric surface are shown in the first right frame of Table 11; coefficients of aspheric surface of the second optical disk side ringed belt-like aspheric surfaces are shown in the second left frame of Table 11; coefficients of aspheric surface of the third optical disk side ringed belt-like aspheric surfaces 24a are shown in the second right frame of Table 11; coefficients of aspheric surface of the fourth optical disk side ringed belt-like aspheric surface 25a are shown in the third left frame of Table 11, and coefficients of aspheric surface of the fifth optical disk side ringed belt-like aspheric surface 26a are shown in the third right frame of Table 11.

TABLE 11

| | |
|---|---|
| $r_2$ = −3.340008 | $r_2$ = −3.3432047 |
| $k_2$ = −10 | $k_2$ = −10 |
| $a_{2.2}$ = 7.015422E-3 | $a_{2.2}$ = 7.111702E-3 |
| $a_{4.2}$ = 2.0917566E-2 | $a_{4.2}$ = 2.086996E-2 |
| $a_{6.2}$ = −6.8247138E-3 | $a_{6.2}$ = −6.807255E-3 |
| $a_{8.2}$ = 6.74139E-4 | $a_{8.2}$ = 6.718432E-4 |
| $r_2$ = −3.3478395 | $r_2$ = −3.3524715 |
| $k_2$ = −10 | $k_2$ = −10 |
| $a_{2.2}$ = 7.145621E-3 | $a_{2.2}$ = 7.17975E-3 |
| $a_{4.2}$ = 2.085166E-2 | $a_{4.2}$ = 2.083321E-2 |
| $a_{6.2}$ = −6.798639E-3 | $a_{6.2}$ = −6.789984E-3 |
| $a_{8.2}$ = 6.706505E-4 | $a_{8.2}$ = 6.694536E-4 |
| $r_2$ = −3.3478395 | $r_2$ = −3.3524715 |
| $k_2$ = −10 | $k_2$ = −10 |
| $a_{2.2}$ = 7.145621E-3 | $a_{2.2}$ = 7.17975E-3 |
| $a_{4.2}$ = 2.085166E-2 | $a_{4.2}$ = 2.083321E-2 |
| $a_{6.2}$ = −6.798639E-3 | $a_{6.2}$ = −6.789984E-3 |
| $a_{8.2}$ = 6.706505E-4 | $a_{8.2}$ = 6.694536E-4 |

Table 12 shows each head formed in the surface at a light source side of the objective lens 3. In Table 12, each light source side ringed belt-like aspheric surface is provided at an optical disk side with respect to the apex at a light source side.

TABLE 12

| | |
|---|---|
| Head of the step portion between light source side apex aspheric surface and first light source side ringed belt-like aspheric surface | 1.20 $\mu$m |
| Head of the step portion between first light source side ringed belt-like aspheric surface and second light source side ringed belt-like aspheric surface | 2.40 $\mu$m |
| Head of the step portion between second light source side ringed belt-like aspheric surface and third light source side ringed belt-like aspheric surface | 3.60 $\mu$m |
| Head of the step portion between third light source side ringed belt-like aspheric surface and fourth light source side ringed belt-like aspheric surface | 4.80 $\mu$m |
| Head of the step portion between fourth light source side ringed belt-like aspheric surface and fifth light source side ringed belt-like aspheric surface | 3.60 $\mu$m |
| Head of the step portion between fifth light source side ringed belt-like aspheric surface and sixth light source side ringed belt-like aspheric surface | 2.40 $\mu$m |

Table 13 shows each head in the surface at a disk side of the objective lens 3. In Table 13, each disk side ringed belt-like aspheric surface is provided at a light source side with respect to the apex at a disk side.

TABLE 13

| | |
|---|---|
| Head of the step portion between disk side apex aspheric surface and first disk side ringed belt-like aspheric surface | 1.45 μm |
| Head of the step portion between first disk side ringed belt-like aspheric surface and second disk side ringed belt-like aspheric surface | 2.90 μm |
| Head of the step portion between second disk side ringed belt-like aspheric surface and third disk side ringed belt-like aspheric surface | 4.35 μm |
| Head of the step portion between third disk side ringed belt-like aspheric surface and fourth disk side ringed belt-like aspheric surface | 2.90 μm |
| Head of the step portion between fourth disk side ringed belt-like aspheric surface and fifth disk side ringed belt-like aspheric surface | 4.35 μm |

Table 14 shows an outer diameter of each aspheric surface of the objective lens 3.

TABLE 14

| | |
|---|---|
| Outer diameter of light source side apex aspheric surface | 0.696 |
| Outer diameter of first light source side ringed belt-like aspheric surface | 1.120 |
| Outer diameter of second light source side ringed belt-like aspheric surface | 1.584 |
| Outer diameter of third light source side ringed belt-like aspheric surface | 2.098 |
| Outer diameter of fourth light source side ringed belt-like aspheric surface | 2.882 |
| Outer diameter of fifth light source side ringed belt-like aspheric surface | 3.016 |
| Outer diameter of sixth light source side ringed belt-like aspheric surface | 3.998 |
| Outer diameter of disk side apex aspheric surface | 0.564 |
| Outer diameter of first disk side ringed belt-like aspheric surface | 0.914 |
| Outer diameter of second disk side ringed belt-like aspheric surface | 1.234 |
| Outer diameter of third disk side ringed belt-like aspheric surface | 1.978 |
| Outer diameter of fourth disk side ringed belt-like aspheric surface | 2.800 |
| Outer diameter of fifth disk side ringed belt-like aspheric surface | 3.662 |

Figure 19:
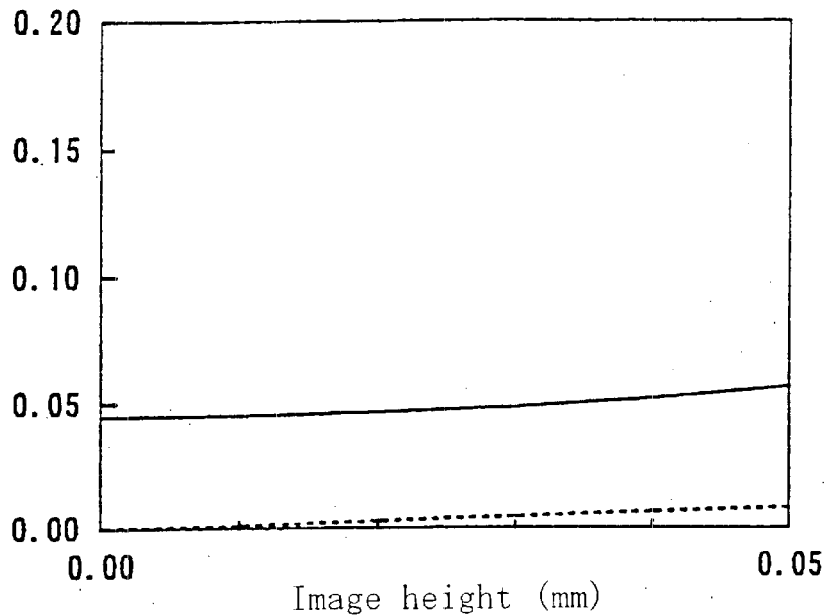
FIG. 19 is an off-axial wavefront aberration characteristic diagram of an optical system for CD in Example 6.
Figure 20:
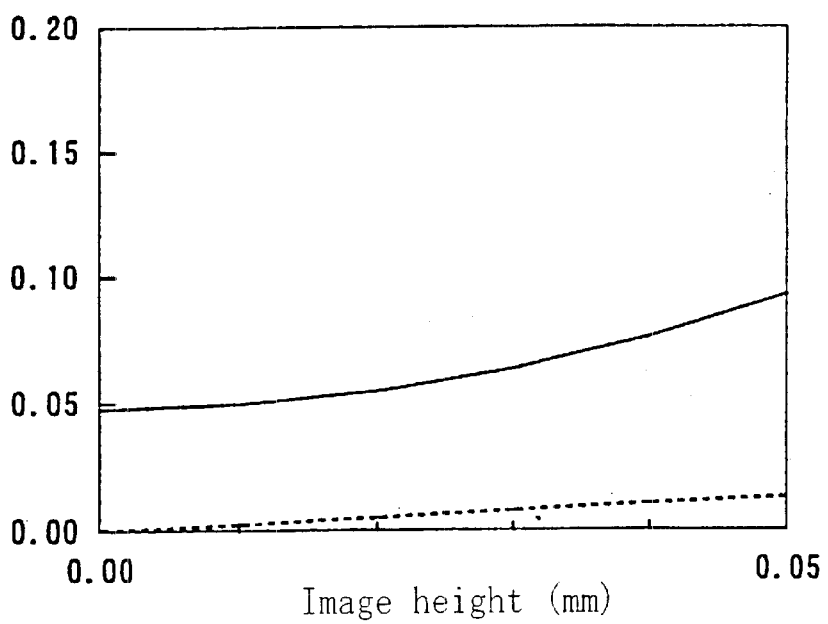
FIG. 20 is an off-axial wavefront aberration characteristic diagram of an optical system for DVD in Example 6.

FIG. 19 shows the off-axial wavefront aberration characteristics of the optical system for CD. FIG. 20 shows the off-axial wavefront aberration characteristics of the optical system for DVD. An objective lens of Example 6 was prepared by injection-molding a plastic material and the optical device as shown in FIG. 5 was fabricated. When recording or reading was conducted to CD and DVD with this optical device, accurate recording or reading could be performed for both.

Example 7

Example

An objective lens used for the optical device shown in FIG. 5 was designed wherein 7 ringed belt-like aspheric surfaces were formed in the surface at a light source side and 6 ringed belt-like aspheric surfaces were formed in the surface at an optical disk side.

The objective lens was designed so that for either CD or DVD, the off-axial coma aberration was excellent The 7 ringed belt-like aspheric surfaces formed in the first surface were for phase correction so that the on-axial characteristics can be corrected, and the 6 ringed belt-like aspheric surfaces formed in the second surface were to correct the on-axial spherical aberration for DVD. Table 15 shows basic specifications of the objective lens. Specifications such as wavelength which are not described in Table 15 are the same as those of Example 4.

TABLE 15

| | |
|---|---|
| $f_1$ = 2.55 mm | $d_1$ = 2.00 mm |
| $f_2$ = 2.57 mm | $n_1$ = 1.5407 |
| $NA_1$ = 0.652 | $n_2$ = 1.5373 |
| $NA_2$ = 0.521 | |

| | Optical system for CD | Optical system for DVD |
|---|---|---|
| Aperture (diameter) | 2.95 mm | 3.67 mm |
| Lateral magnification of optical system ($\beta_1$, $\beta_2$) | −0.141 | −0.140 |
| $P_1$, $P_2$ | 1.21 mm | 1.55 mm |
| Object-image distance | 24.66 mm | 24.40 mm |

Table 16 shows coefficients of each aspheric surface in the surface at a light source side of the objective lens. The arrangement of Table 16 is the same as that of Table 10.

TABLE 16

| | |
|---|---|
| $r_1$ = 1.234846 | $r_1$ = 1.1634294 |
| $k_1$ = −1.0 | $k_1$ = −1.0 |
| $a_{2.1}$ = −1.3139328E-1 | $a_{2.1}$ = −1.5603466E-1 |
| $a_{4.1}$ = 6.6895145E-3 | $a_{4.1}$ = 6.6848582E-3 |
| $a_{6.1}$ = −1.7447414E-2 | $a_{6.1}$ = 1.2693633E-3 |
| $a_{8.1}$ = −2.074402E-1 | $a_{8.1}$ = −9.2341995E-4 |
| $r_1$ = 1.1698184 | $r_1$ = 1.1645566 |
| $k_1$ = −1.0 | $k_1$ = −1.0 |
| $a_{2.1}$ = −1.5354606E-1 | $a_{2.1}$ = 1.5538623E-1 |
| $a_{4.1}$ = 7.1344032E-3 | $a_{4.1}$ = 7.2087399E-3 |
| $a_{6.1}$ = 2.2354359E-3 | $a_{6.1}$ = 2.359297E-3 |
| $a_{8.1}$ = −6.5109508E-4 | $a_{8.1}$ = −5.0556432E-4 |
| $r_1$ = 1.1625739 | $r_1$ = 1.1646983 |
| $k_1$ = −1.0 | $k_1$ = −1.0 |
| $a_{2.1}$ = −1.56048E-1 | $a_{2.1}$ = −1.5536232E-1 |
| $a_{4.1}$ = 7.2455664E-3 | $a_{4.1}$ = 7.2354391E-3 |
| $a_{6.1}$ = 2.3780254E-3 | $a_{6.1}$ = 2.3787076E-3 |
| $a_{8.1}$ = −4.9728948E-4 | $a_{8.1}$ = −4.9379052E-4 |
| $r_1$ = 1.1698297 | |
| $k_1$ = −1.0 | |
| $a_{2.1}$ = −1.5351142E-1 | |
| $a_{4.1}$ = 7.23049E-3 | |
| $a_{6.1}$ = 2.376055E-3 | |
| $a_{8.1}$ = −4.9455293E-4 | |

Table 17 shows coefficients of each aspheric surface in the surface at an optical disks of the objective lens. The arrangement of Table 17 is the same as that of Table 11.

TABLE 17

| | |
|---|---|
| $r_2$ = −3.318011 | $r_2$ = −3.3430456 |
| $k_2$ = −10 | $k_2$ = −10 |
| $a_{2.2}$ = 6.9401748E-3 | $a_{2.2}$ = 7.0902766E-3 |
| $a_{4.2}$ = 1.8184351E-2 | $a_{4.2}$ = 1.9972318E-2 |
| $a_{6.2}$ = −8.0507917E-2 | $a_{6.2}$ = −1.1906001E-2 |
| $a_{8.2}$ = −2.869907E-1 | $a_{8.2}$ = −1.999556E-2 |
| $r_2$ = −3.3502186 | $r_2$ = −3.352159 |
| $k_2$ = −10 | $k_2$ = −10 |
| $a_{2.2}$ = 7.135788E-3 | $a_{2.2}$ = 7.1767339E-3 |
| $a_{4.2}$ = 2.0668896E-2 | $a_{4.2}$ = 2.0824246E-2 |
| $a_{6.2}$ = −7.671281E-3 | $a_{6.2}$ = −6.7437767E-3 |
| $a_{8.2}$ = −3.0715885E-3 | $a_{8.2}$ = 7.695503E-4 |
| $r_2$ = −3.3482377 | $r_2$ = −3.3523753 |
| $k_2$ = −10 | $k_2$ = −10 |
| $a_{2.2}$ = 7.152478E-3 | $a_{2.2}$ = 7.1766873E-3 |
| $a_{4.2}$ = 2.0850797E-2 | $a_{4.2}$ = 2.0831735E-2 |

TABLE 17-continued

| | |
|---|---|
| $a_{6,2} = -6.8047193E-3$ | $a_{6,2} = -6.7902997E-3$ |
| $a_{8,2} = 6.6269524E-4$ | $a_{8,2} = 6.6924933E-4$ |

Each head in the surface 3 at a light source of the objective lens was the same (Table 12) as that of the objective lens of Example 6. Each head in the surface at a side of the disks of the objective lens 3 was also the same (Table 13) as that of the objective lens of Example 6. The outer diameter of each aspheric surface of the objective lens 3 was the same (Table 14) as that of the objective lens of Example 6.

Figure 21:
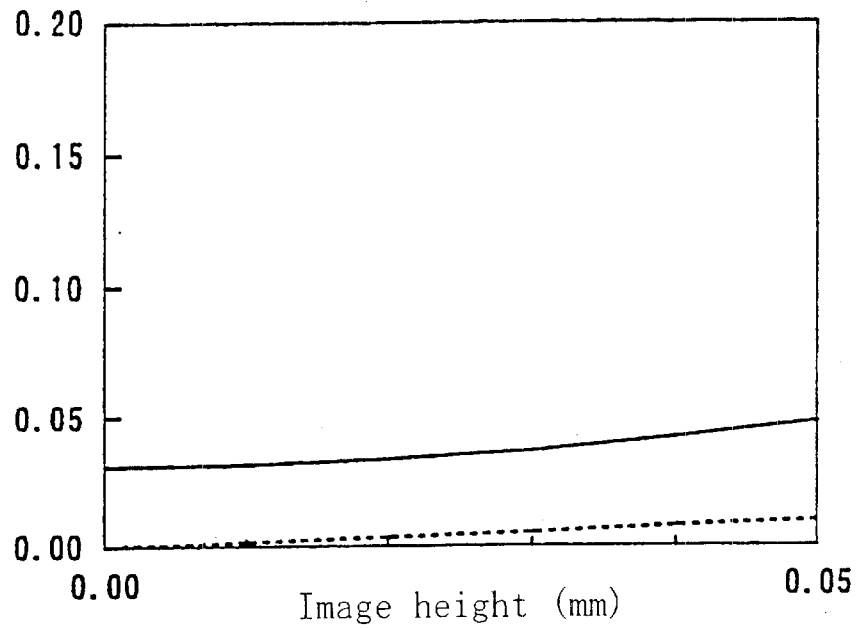
FIG. 21 is an off-axial wavefront aberration characteristic diagram of an optical system for CD in Example 7 and FIG. 22 is an off-axial wavefront aberration characteristic diagram of an optical system for DVD in Example 7.
Figure 22:
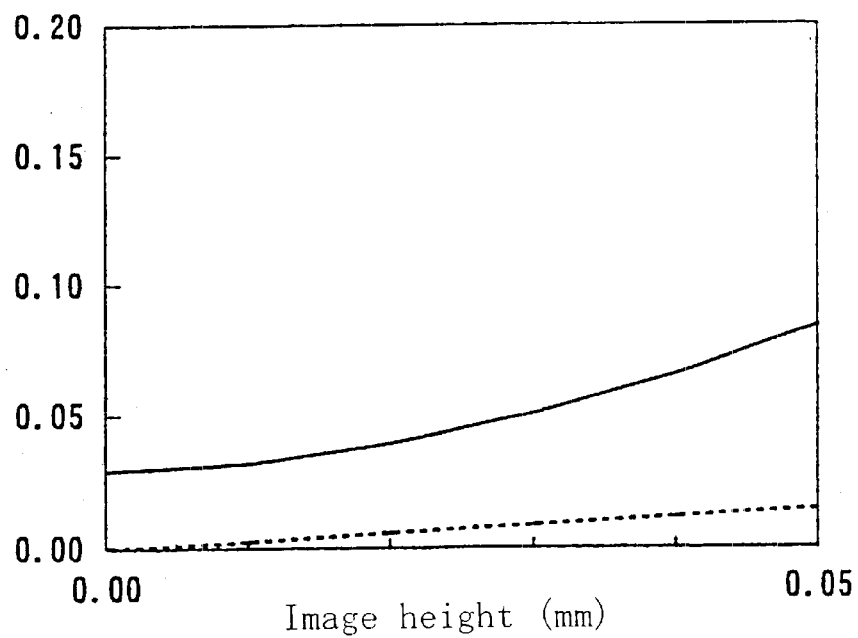

FIG. 21 shows the off-axial wavefront aberration characteristics of the optical system for CD. FIG. 22 shows the off-axial wavefront aberration characteristics of the optical system for DVD. An objective lens of Example 7 was prepared by injection-molding a plastic material and optical device as shown in FIG. 5 was fabricated. When recording or reading was conducted to CD and DVD with this optical device, accurate recording or reading could be performed for both.

The objective lens of the present invention is provided with the first phase shifter in a surface of the lens, which has function to produce a phase difference with respect to light having the first wavelength and the second phase shifter in the other surface of the lens, which has function to produce a phase difference with respect to light having the second wavelength. Accordingly, when recording or reading is conducted to the first optical disk and the second optical disk, both the on-axial aberration and the off-axial aberration can be corrected well.

Accordingly, the objective lens of the present invention provides excellent on-axial aberration and off-axial aberration even when an inclination of the light source or the objective lens from the optical axis or a shift of axis of it is caused with the lapse of time. Further, in the objective lens, it is easy to increase precision, and a possibility that the optical performance decreases with the lapse of time is little.

The entire disclosure of Japanese Patent Application No. 2000-099580 filed on Mar. 31, 2000 including specification, claims, drawings and summary are incorporated herein by reference in its entirety.

What is claimed is:

1. An objective lens having two aspheric surfaces configured to be used in an optical system in which light from at least one light source is converged to respective data recording surfaces of two optical disks, and reflection light from the respective data recording surfaces is received by a light receiving element in recording or reading the two optical disks, and in recording or reading a first optical disk, a first wavelength $\lambda_1$ is used, and in recording or reading a second optical disk, a second wavelength $\lambda_2$ is used, comprising:

a first phase shifter including ring-like step portions having a center coincident with an optical axis provided in a surface of the objective lens, the first shifter producing a phase difference with respect to light having the first wavelength $\lambda_1$, and a second phase shifter including ring-like step portions having a center coincident with the optical axis provided in the other surface of the objective lens, the second phase shifter producing a phase difference with respect to light having the second wavelength $\lambda_2$, wherein dimensions and a shape of the step portions of the first phase shifter are determined so that the phase difference caused by the light having the first wavelength $\lambda_1$ is equivalent to (0.9 $\lambda_2$ to 1.1 $\lambda_2$) times a natural number, and dimensions and a shape of the step portions of the second phase shifter are determined so that the phase difference caused by the light having the second wavelength $\lambda_2$ is equivalent to (0.9 $\lambda$, to 1.1 $\lambda$,) times a natural number.

2. The objective lens according to claim 1, wherein at least one of a convex portion and a concave portion is provided in at least one surface of the objective lens, whereby at least one step portion is formed.

3. The objective lens according to claim 1, wherein a numerical aperture $NA_1$ of the objective lens in recording or reading the first optical disk and a numerical aperture $NA_2$ of the objective lens in recording or reading the second optical disk satisfy $NA_1 > NA_2$, and an inner diameter $\Phi_1$ of a step portion having a smallest diameter among the step portions of the first phase shifter, an effective diameter $\Phi_3$ of the surface of the objective lens at which the first phase shifter is provided, an inner diameter $\Phi_2$ of a step portion having a smallest diameter among the step portions of the second phase shifter, and an effective diameter $\Phi_4$ of the surface of the objective lens at which the second phase shifter is provided, satisfy $(\Phi_1/\Phi_3) > (\Phi_2/\Phi_4)$.

4. The objective lens according to claim 1, wherein a thickness $t_1$ of a transparent substrate of the first optical disk and a thickness $t_2$ of a transparent substrate of the second optical disk satisfy $1.5 * t_1 < t_2$, and a total number of rings of the step portions of the first phase shifter is at least 3, but at most 10, and a total number of rings of the step portions of the second phase shifter is at least 3, but at most 10.

5. The objective lens according to claim 1, wherein the objective lens is used in an optical system in which both light having the first wavelength and light having the second wavelength are converged to the data recording surfaces of the two optical disks through an auxiliary lens and the objective lens, a ringed belt-like aspheric surface is formed between a ring of a step portion and a ring of another step portion in a surface of the objective lens, and a combination of the auxiliary lens, the ringed belt-like aspheric surface in the surface of the objective lens, and an aspheric surface in the surface including an apex in the other surface of the objective lens, with respect to the light having the first wavelength, is determined such that an off-axial coma aberration in an image height of 0.05 mm is at most $0.03 * \lambda_1$ in RMS value when data in the data recording surface of the first optical disk are recorded or read, and a ringed belt-like aspheric surface is formed between a ring of a step portion and the ring of another step portion in the other surface of the objective lens, and a combination of the auxiliary lens, an aspheric surface in the surface including an apex in the surface of the objective lens, and the ringed belt-like aspheric surface in the other surface of the objective lens, with respect to the light having the second wavelength, is determined such that an off-axial coma aberration in an image height of 0.05 mm is at most $0.03 * \lambda_2$ in RMS value when data in the data recording surface of the second optical disk are recorded or read.

6. The objective lens according to claim 1, wherein the objective lens is used in an optical system in which both light having the first wavelength and light having the second wavelength are converged to the data recording surfaces of the two optical disks through a collimeter lens and the objective lens, a ringed belt-like aspheric surface is formed between a ring of a step portion and a ring of another step portion in a surface of the objective lens, and a combination of the collimeter lens, the ringed belt-like aspheric surface in the surface of the objective lens, and an aspheric surface in the surface including an apex in the other surface of the objective lens, with respect to the light having the first wavelength, is determined such that an off-axial coma aberration in an image height of 0.05 mm is at most $0.03* \lambda_1$ in RMS value when data in the data recording surface of the first optical disk are recorded or read, and a ringed belt-like aspheric surface is formed between a ring of a step portion and the ring of another step portion in the other surface of the objective lens, and a combination of the collimeter lens, an aspheric surface in the surface including an apex in the surface of the objective lens, and the ringed belt-like aspheric surface in the other surface of the objective lens, with respect to the light having the second wavelength, is determined such that an off-axial coma aberration in an image height of 0.05 mm is at most $0.03* \lambda_2$ in RMS value when data in the data recording surface of the second optical disk are recorded or read.

7. The objective lens according to claim 1, wherein the objective lens is used in an optical system in which both light having the first wavelength from a light source and light having the second wavelength from a light source are respectively converged to the data recording surfaces of the two optical disks by means of the objective lens, a ringed belt-like aspheric surface is formed between a ring of a step portion and a ring of another step portion in a surface of the objective lens, and a combination of each ringed belt-like aspheric surface in the surface of the objective lens, and an aspheric surface in the surface including an apex in the other surface of the objective lens, with respect to the light having the first wavelength, is determined such that an off-axial coma aberration in an image height of 0.05 mm is at most $0.03* \lambda_1$ in RMS value when data in the data recording surface of the first optical disk are recorded or read, and a ringed belt-like aspheric surface is formed between a ring of a step portion and a ring of another step portion in the other surface of the objective lens, and a combination of an aspheric surface in the surface including an apex in the surface of the objective lens, and each ringed belt-like aspheric surface in the other surface of the objective lens, with respect to the light having the second wavelength, is determined such that an off-axial coma aberration in an image height of 0.05 mm is at most $0.03* \lambda_2$ in RMS value when data in the data recording surface of the second optical disk are recorded or read.

8. The objective lens according to claim 1, wherein a numerical aperture $NA_2$ of the objective lens used for the first optical disk and a numerical aperture $NA_2$ of the objective lens used for the second optical disk satisfy $NA_1 > NA_2$, and a step portion is provided in a ringed belt-like region having a center coincident with the optical axis, in at least one surface of the objective lens to prevent the light having the second wavelength from passing through to throttle light to the numerical aperture $NA_2$.

9. An optical device in which light from a light source having different wavelengths is converged to respective data recording surfaces of two optical disks, and reflection light from the respective data recording surfaces is received by a light receiving element in recording or reading the optical disks, and in recording or reading a first optical disk, a first wavelength $\lambda_1$ is used, and in recording or reading a second optical disk, a second wavelength $\lambda_2$ is used, the optical device comprising an objective lens, wherein the objective lens comprises:

a first phase shifter including ring-like step portions having a center coincident with an optical axis provided in a surface of the objective lens, the first shifter producing a phase difference with respect to light having the first wavelength $\lambda_1$, and a second phase shifter including ring-like step portions having a center coincident with the optical axis provided in another surface of the objective lens, the second phase shifter producing a phase difference with respect to light having the second wavelength $\lambda_2$, wherein dimensions and a shape of the step portions of the first phase shifter are determined so that the phase difference caused by the light having the first wavelength $\lambda_1$ is equivalent to (0.9 $\lambda_2$ to 1.1 $\lambda_2$) times a natural number, and dimensions and a shape of the step portions of the second phase shifter are determined so that the phase difference caused by the light having the second wavelength $\lambda_2$ is equivalent to (0.9 $\lambda_1$ to 1.1 $\lambda_1$) times a natural number.

10. An objective lens having two aspheric surfaces configured to be used in an optical system in which light from at least one light source is converged to respective data recording surfaces of two optical disks, and reflection light from the respective data recording surfaces is received by a light receiving element in recording or reading the two optical disks, and in recording or reading a first optical disk, a first wavelength $\lambda_1$ is used, and in recording or reading a second optical disk, a second wavelength $\lambda_2$ is used, comprising:

a first phase shifter including ring-like step portions having a center coincident with an optical axis provided in a surface of the objective lens, the first shifter producing a phase difference with respect to light having the first wavelength $\lambda_1$, and a second phase shifter including ring-like step portions having a center coincident with the optical axis provided in the other surface of the objective lens, the second phase shifter producing a phase difference with respect to light having the second wavelength $\lambda_2$, wherein the objective lens is used in an optical system in which both light having the first wavelength and light having the second wavelength are converged to the data recording surfaces of the two optical disks through a collimeter lens and the objective lens, a ringed belt-like aspheric surface is formed between a ring of a step portion and a ring of another step portion in a surface of the objective lens, and a combination of the collimeter lens, the ringed belt-like aspheric surface in the surface of the objective lens, and an aspheric surface in the surface including an apex in the other surface of the objective lens, with respect to the light having the first wavelength, is determined such that an off-axial coma aberration in an image height of 0.05 mm is at most $0.03* \lambda_1$ in RMS value when data in the data recording surface of the first optical disk are recorded or read, and a ringed belt-like aspheric surface is formed between a ring of a step portion and the ring of another step portion in the other surface of the objective lens, and a combination of the collimeter lens, an aspheric surface in the surface including an apex in the surface of the objective lens, and the ringed belt-like aspheric surface in the other surface of the objective lens, with respect to the light having the second wavelength, is determined such that an off-axial coma aberration in an image height of 0.05 mm is at most $0.03* \lambda_2$ in RMS value when data in the data recording surface of the second optical disk are recorded or read.

11. The objective lens of claim 10, wherein at least one of a convex portion and a concave portion is provided in at least one surface of the objective lens, whereby at least one step portion is formed.

12. The objective lens of claim 10, wherein a numerical aperture $NA_1$ of the objective lens in recording or reading the first optical disk and a numerical aperture $NA_2$ of the objective lens in recording or reading the second optical disk satisfy $NA_1 > NA_2$, and an inner diameter $\Phi_1$ of a step portion having a smallest diameter among the step portions of the first phase shifter, an effective diameter $\Phi_3$ of the surface of the objective lens at which the first phase shifter is provided, an inner diameter $\Phi_2$ of a step portion having a smallest diameter among the step portions of the second phase shifter, and an effective diameter $\Phi_4$ of the surface of the objective lens at which the second phase shifter is provided, satisfy $(\Phi_1/\Phi_3) > (\Phi_2/\Phi_4)$.

13. The objective lens of claim 10, wherein a thickness $t_1$ of a transparent substrate of the first optical disk and a thickness $t_2$ of a transparent substrate of the second optical disk satisfy $1.5*t_1 < t_2$, and a total number of rings of the step portions of the first phase shifter is at least 3, but at most 10, and a total number of rings of the step portions of the second phase shifter is at least 3, but at most 10.

14. An objective lens having two aspheric surfaces configured to be used in an optical system in which light from at least one light source is converged to respective data recording surfaces of two optical disks, and reflection light from the respective data recording surfaces is received by a light receiving element in recording or reading the two optical disks, and in recording or reading a first optical disk, a first wavelength $\lambda_1$ is used, and in recording or reading a second optical disk, a second wavelength $\lambda_2$ is used, comprising:

a first phase shifter including ring-like step portions having a center coincident with an optical axis provided in a surface of the objective lens, the first shifter producing a phase difference with respect to light having the first wavelength $\lambda_1$, and a second phase shifter including ring-like step portions having a center coincident with the optical axis provided in the other surface of the objective lens, the second phase shifter producing a phase difference with respect to light having the second wavelength $\lambda_2$, wherein the objective lens is used in an optical system in which both light having the first wavelength from a light source and light having the second wavelength from a light source are respectively converged to the data recording surfaces of the two optical disks by means of the objective lens, a ringed belt-like aspheric surface is formed between a ring of a step portion and a ring of another step portion in a surface of the objective lens, and a combination of each ringed belt-like aspheric surface in the surface of the objective lens, and an aspheric surface in the surface including an apex in the other surface of the objective lens, with respect to the light having the first wavelength, is determined such that an off-axial coma aberration in an image height of 0.05 mm is at most $0.03* \lambda_1$ in RMS value when data in the data recording surface of the first optical disk are recorded or read, and a ringed belt-like aspheric surface is formed between a ring of a step portion and a ring of another step portion in the other surface of the objective lens, and a combination of an aspheric surface in the surface including an apex in the surface of the objective lens, and each ringed belt-like aspheric surface in the other surface of the objective lens, with respect to the light having the second wavelength, is determined such that an off-axial coma aberration in an image height of 0.05 mm is at most $0.03* \lambda_2$ in RMS value when data in the data recording surface of the second optical disk are recorded or read.

15. The objective lens of claim 14, wherein at least one of a convex portion and a concave portion is provided in at least one surface of the objective lens, whereby at least one step portion is formed.

16. The objective lens of claim 14, wherein a numerical aperture $NA_1$ of the objective lens in recording or reading the first optical disk and a numerical aperture $NA_2$ of the objective lens in recording or reading the second optical disk satisfy $NA_1 > NA_2$, and an inner diameter $\Phi_1$ of a step portion having a smallest diameter among the step portions of the first phase shifter, an effective diameter $\Phi_3$ of the surface of the objective lens at which the first phase shifter is provided, an inner diameter $\Phi_2$ of a step portion having a smallest diameter among the step portions of the second phase shifter, and an effective diameter (P4 of the surface of the objective lens at which the second phase shifter is provided, satisfy $(\Phi_1/\Phi_3) > (\Phi_2/\Phi_4)$.

17. The objective lens of claim 14, wherein a thickness $t_1$ of a transparent substrate of the first optical disk and a thickness $t_2$ of a transparent substrate of the second optical disk satisfy $1.5*t_1 < t_2$, and a total number of rings of the step portions of the first phase shifter is at least 3, but at most 10, and a total number of rings of the step portions of the second phase shifter is at least 3, but at most 10.

* * * * *

UNITED STATES PATENT AND TRADEMARK OFFICE
CERTIFICATE OF CORRECTION

PATENT NO. : 6,556,534 B2
DATED : April 29, 2003
INVENTOR(S) : Shimozono

It is certified that error appears in the above-identified patent and that said Letters Patent is hereby corrected as shown below:

<u>Title page, Item [54] and Column 1, line 1,</u>
Title should read:
-- OBJECTIVE LENS WITH PHASE SHIFTER --.

Signed and Sealed this

Eleventh Day of November, 2003

JAMES E. ROGAN
*Director of the United States Patent and Trademark Office*